US011975539B2

(12) United States Patent

Buskirk et al.

(10) Patent No.: US 11,975,539 B2

(45) Date of Patent: May 7, 2024

(54) SYSTEMS AND METHODS FOR CONTROLLING OPERATION OF MICRO-VALVES FOR USE IN JETTING ASSEMBLIES

(71) Applicant: Matthews International Corporation, Pittsburgh, PA (US)

(72) Inventors: William A. Buskirk, Albany, OR (US); Steven E. Flego, Portland, OR (US); Charles C. Haluzak, Philomath, OR (US); John Whitlock, Pittsburgh, PA (US); Eric R. Miller, Seattle, WA (US); Ken Trueba, Pittsburgh, PA (US); Jeff Hess, Corvallis, OR (US)

(73) Assignee: Matthews International Corporation, Pittsburgh, PA (US)

( * ) Notice: Subject to any disclaimer, the term of this patent is extended or adjusted under 35 U.S.C. 154(b) by 0 days.

(21) Appl. No.: 18/202,509

(22) Filed: May 26, 2023

(65) Prior Publication Data

US 2024/0034058 A1 Feb. 1, 2024

Related U.S. Application Data

(63) Continuation of application No. 17/245,902, filed on Apr. 30, 2021, now Pat. No. 11,660,861, which is a continuation of application No. 16/407,487, filed on May 9, 2019, now Pat. No. 10,994,535.

(60) Provisional application No. 62/712,052, filed on Jul. 30, 2018, provisional application No. 62/670,306, filed on May 11, 2018.

(51) Int. Cl.
*B41J 2/045* (2006.01)

(52) U.S. Cl.
CPC ....... *B41J 2/04588* (2013.01); *B41J 2/04586* (2013.01)

(58) Field of Classification Search
CPC .................. B41J 2/0451; B41J 2/04581; B41J 2002/14354; B41J 2202/05; B41J 2/04588; B41J 2/04586
See application file for complete search history.

(56) References Cited

U.S. PATENT DOCUMENTS 6,988,787 B2 * 1/2006 Silverbrook ........... B41J 2/1646 347/56
7,780,267 B2 * 8/2010 Lijima ................. B41J 2/14427 347/56
2014/0333703 A1 * 11/2014 Buskirk ............... B41J 2/17596 347/85

* cited by examiner

*Primary Examiner* — An H Do
(74) *Attorney, Agent, or Firm* — DLA Piper LLP

(57) ABSTRACT

A marking system includes a valve body including an orifice plate including multiple orifices and multiple micro-valves. Each micro-valve includes an actuating beam movable from a closed position in which a corresponding one of the orifices is sealed by a portion of the actuating beam such that the micro-valve is closed, into a peak position in response to application of a control signal. A controller is configured to generate a control signal for each of the actuating beams, each control signal including a drive pulse having a predetermined voltage such that the actuating beam moves from the closed position into the peak position in which the corresponding orifice is open and returns to the closed position in a characteristic period, wherein the drive pulse has a duration that substantially corresponds to the characteristic period such that the actuating beam is in the closed position after the drive pulse is complete.

18 Claims, 17 Drawing Sheets

SYSTEMS AND METHODS FOR CONTROLLING OPERATION OF MICRO-VALVES FOR USE IN JETTING ASSEMBLIES

CROSS-REFERENCE TO RELATED APPLICATIONS

The present application claims priority to and benefit of U.S. Non-Provisional patent application Ser. No. 17/245,902 filed Apr. 30, 2021, now U.S. Pat. No. 11,660,861, which claims priority to and benefit of U.S. Non-Provisional patent application Ser. No. 16/407,487 filed May 9, 2019, now U.S. Pat. No. 10,994,535, which claims priority to and benefit of U.S. Provisional Application No. 62/670,306 filed May 11, 2018, and U.S. Provisional Application No. 62/712,052, filed Jul. 30, 2018, the disclosures of which are each incorporated by reference herein in their entirety.

TECHNICAL FIELD

The present disclosure relates generally to the field of micro-valves fabricated using micro-electro-mechanical systems (MEMS) techniques. More specifically, the present disclosure relates to jetting assemblies including micro-valves that are used for industrial marking and coding.

BACKGROUND

Conventional printing technologies have several shortcomings. For example, continuous inkjet printers have certain deficiencies that are difficult to eliminate. The process of generating droplets from an ink supply, for example, may lead to ink dripping in an undesired direction (e.g., away from a target), leading to maintenance requirements. Additionally, makeup fluid is lost over time as a result of evaporation, requiring continuous replenishment. Other maintenance costs, such as repairing orifice plates due to degradation, are also required.

SUMMARY

One embodiment relates to a marking system. The marking system includes a valve body including an orifice plate including at least one orifice extending therethrough and at least one micro-valve. Each of the at least one micro-valve includes an actuating beam movable from a closed position in which a corresponding one of the orifices is sealed by a portion of the actuating beam such that the micro-valve is closed, wherein the actuating beam is movable from the closed position into a peak position in response to application of a control signal thereto. The marking system also includes a controller electrically connected to the actuating beams. The controller is configured to generate a control signal for each of the actuating beams, wherein each control signal includes a drive pulse having a predetermined voltage, wherein, in response to the drive pulse, the actuating beam oscillates such that the actuating beam moves from the closed position to a peak position in which the corresponding orifice is open and returns to the closed position in a characteristic period, wherein the drive pulse has a duration that substantially corresponds to the characteristic period such that the actuating beam is in the closed position after the drive pulse is complete.

Another embodiment relates to a method of calibrating a marking system including at least one actuating beam. The method includes applying, by a controller electrically connected to an actuating beam of a micro-valve, a drive pulse to the actuating beam, the drive pulse having a predetermined voltage configured to induce an oscillation of the actuating beam. The calibration method also includes determining an oscillation period of a natural frequency of the actuating beam, the oscillation period including an interval between successive times in which the actuating beam is in a closed position where the actuating beam seals an orifice in an orifice plate on which the actuating beam is disposed such that the micro-valve is closed. The method also includes determining a drive pulse ON time based on the oscillation period. The method also includes setting a drive waveform for the actuating beam, the drive waveform comprising a biasing portion in which the control signal increases from zero volts to a bias voltage, a voltage upswing portion in which a control signal voltage rises from the bias voltage to the predetermined voltage, a driving portion where the control signal voltage is at the predetermined voltage for the drive pulse ON time, and a voltage downswing portion in which the control signal voltage falls from the predetermined voltage to the bias voltage or zero.

BRIEF DESCRIPTION OF THE DRAWINGS

The disclosure will become more fully understood from the following detailed description, taken in conjunction with the accompanying figures, in which.

DETAILED DESCRIPTION

Figure 1:
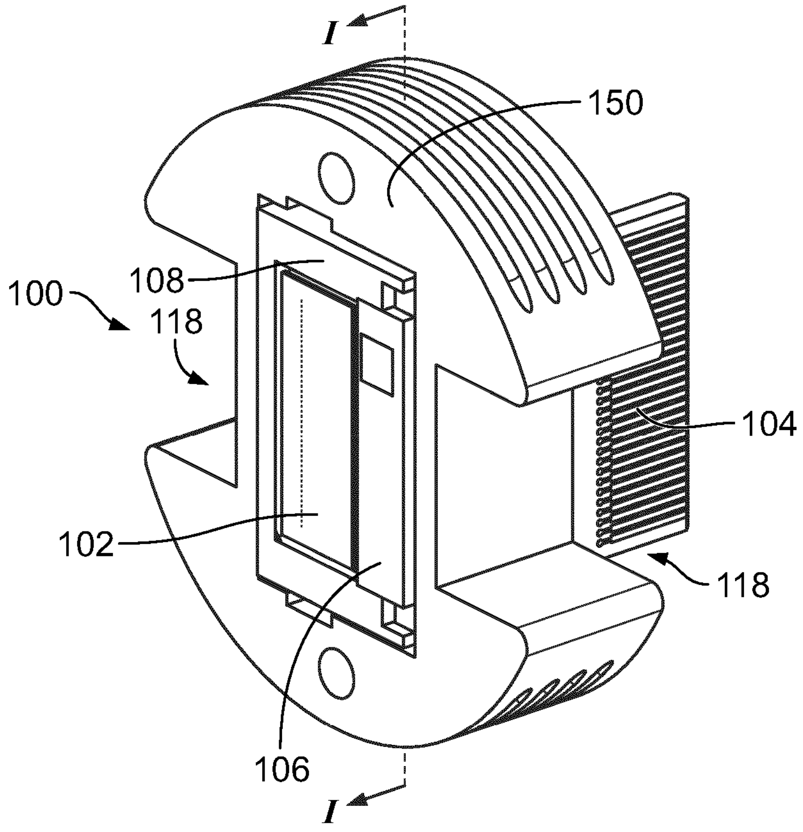
FIG. 1 is a perspective of a jetting assembly disposed in a holder, according to an example embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, described herein is a jetting assembly including multiple micro-valves. The micro-valves described herein employ an actuating beam having a sealing member disposed thereon. The utilization of such an actuating beam enables tailoring the micro-valve to eliminate or reduce various deficiencies associated with conventional technologies including continuous inkjet jetting assemblies. For example, in various embodiments, the micro-valve includes a spacing member disposed between the actuating beam and an orifice plate. The spacing member maintains a spacing of a first end of the actuating beam and an orifice within the orifice plate so as to prevent squeeze film damping of the actuating beam. The actuating beam extends over the orifice from the spacing member and a sealing member extends towards the orifice to form a seal at the orifice. Thus, without application of any electrical energy to the actuating beam, the sealing member seals off the orifice plate. In other words, the default position of the actuating beam (e.g., configured by careful selection of the materials contained therein) is that the micro-valve is closed. As such, fluid (e.g., ink, solvent, etc.) disposed in the micro-valve is sealed off from the external environment of the jetting assembly. This eliminates evaporation of the fluid, which reduces clogs. Additionally, the limited evaporation enables faster-drying ink to be used, which allows for printing at higher speeds than conventional systems.

To mitigate against fluid leaks, the micro-valves described herein include a sealing structure configured to form a seal that separates the orifice from a volume proximate to the actuating beam when the actuating beam is in its default position. The sealing structure may include any combination of a plurality of components designed to ensure the formation of the seal. For example, in various embodiments, the sealing structure includes a valve seat disposed on the orifice plate proximate to the orifice. The valve seat may surround the orifice and define an opening that overlaps with the orifice to define a fluid outlet. The sealing member may contact the valve seat with the actuating beam in the default position. In some embodiments, the valve seat is constructed of a compliant material to facilitate the formation of an enhanced seal resulting from pressure applied due to curvature of the actuating beam.

In another aspect, the sealing structure may include components attached to or extending from the sealing member. For example, in one embodiment, the sealing structure includes a compliant structure extending from an orifice-facing surface of the sealing member. The compliant structure may include a narrow portion and a wider portion having a cross-sectional area greater than that of the orifice. As a result, the actuating beam compresses the compliant structure towards the orifice plate to facilitate the formation of the seal. Alternatively, or additionally, the sealing structure may include a sealing blade extending from the orifice-facing surface to contact the valve seat or orifice plate. The sealing blade further facilitates the formation of the seal due to the pressure resulting from its relatively small cross-sectional area, which focuses downward pressure applied via the actuating beam to a point to form a tight seal. Thus, the various structures described herein enhance the seals formed when the actuating beam is in its default position.

In some arrangements, a drive pulse including a drive waveform may be used to move the actuating beam from a closed position (e.g., the default position) tin which the orifice is sealed and thereby, the micro-valve is closed to an open or peak position away from the orifice. The drive waveform may be configured to maintain the actuating beam in the open position until a desired amount of fluid has been ejected from the orifice. However, some drive pulses may cause the actuating beam to move beyond the peak position, for example, due to an inherent bias (e.g., tension) in the actuating beam. In such scenarios, the actuating beam may recoil towards the orifice and may continue to vibrate until the fluid contained within the micro-valve damps the vibration of the actuating beam. The recoil may cause splatter or interruption in fluid ejection which is undesirable.

Embodiments described herein provide for drive pulses including drive waveforms which may provide benefits including, for example, (1) preventing overshoot of an actuating beam beyond a peak position when moving from a closed position to a peak or open position; (2) limiting recoil and thereby, vibration of the actuating beam on reaching the peak position; and (3) preventing splatter and/or an inaccurate volume in a droplet of a fluid ejected from an orifice of a micro-valve including the actuating beam when the actuating beam is in the open position.

As described herein, the term "default position," when used in describing an actuating beam of a micro-valve, describes the position of the actuating beam with respect to various other components of the micro-valve without application of any control signals (e.g., an electrical charge, current or voltage) to the actuating beam. In other words, the default position is the position of the actuating beam (and any components attached thereto) when the actuating beam is in a passive state. It should be appreciated that other embodiments are envisioned in which the default position is an open position of the actuating beam.

Referring now to FIG. 1, a perspective view of a jetting assembly 100 disposed in a holder 150 is shown, according to an example embodiment. Jetting assembly 100 includes a valve body 102 attached to a carrier 108. The holder 150 may include a substantially circular-shaped body having an opening contained therein adapted to receive the jetting assembly 100. Holder 150's body may include notches 118 extending from a peripheral edge thereof to facilitate attachment of the holder 150 to a marking device. The valve body 102 may be a component of a marking device. In an exemplary embodiment, the valve body 102 is used in an industrial marking device including a pressurized fluid (e.g., ink) supply. In other embodiments, the valve body 102 or any of the micro-valves described herein may be used in pneumatic applications, where the fluid includes a gas (e.g., air, nitrogen, oxygen, etc.).

As described herein, the valve body 102 includes an input fluid manifold attached to a plurality of micro-valves. The micro-valves and the input fluid manifold form a fluid plenum or reservoir configured to hold fluid received from an external fluid supply. In other embodiments, the valve body 102 may define a plurality of fluid plenums, each fluid plenum corresponding to at least a portion of the plurality of micro-valves. In such embodiments, each fluid plenum may be filled with a different colored ink (e.g., black, green, yellow, cyan, etc.) or a different fluid so as to provide multi-color capable jetting assembly or a multi fluid deposition assembly. In various embodiments, the micro-valves include an actuating beam configured to move (e.g., bend, curve, twist, etc.) in response to voltages being applied thereto to temporarily open fluid plenums at orifices in an orifice plate. As a result, droplets are emitted from the fluid outlets defined by the orifices onto a target to produce a desired marking pattern on the target.

As shown, a circuit board 104 is attached to a side surface of the carrier 108. Circuit board 104 may include a plurality of electrical pathways and provide a point of connection between valve body 102 and an electrical controller (e.g., via a wiring harness). The electrical controller may supply control signals via the electrical pathways to control actuation of the actuating beams of multiple micro-valves included in the valve body 102. The structure and function of such micro-valves are described in greater detail herein. In some embodiments, circuit board 104 itself includes a micro-controller that generates and provides control signals to actuate the micro-valves.

An identification tag 106 is attached to jetting assembly 100. In some embodiments, identification tag 106 includes an internal memory configured to store various forms of information (e.g., manufacturing information, serial number, valve calibration information, settings, etc.) regarding jetting assembly 100. For example, in one embodiment, identification tag 106 is a radio frequency identification (RFID) tag configured to transmit the stored information in a receivable manner in response to receiving a predetermined identifier from an external device. This way, information regarding jetting assembly 100 may be quickly and efficiently retrieved.

Figure 2:
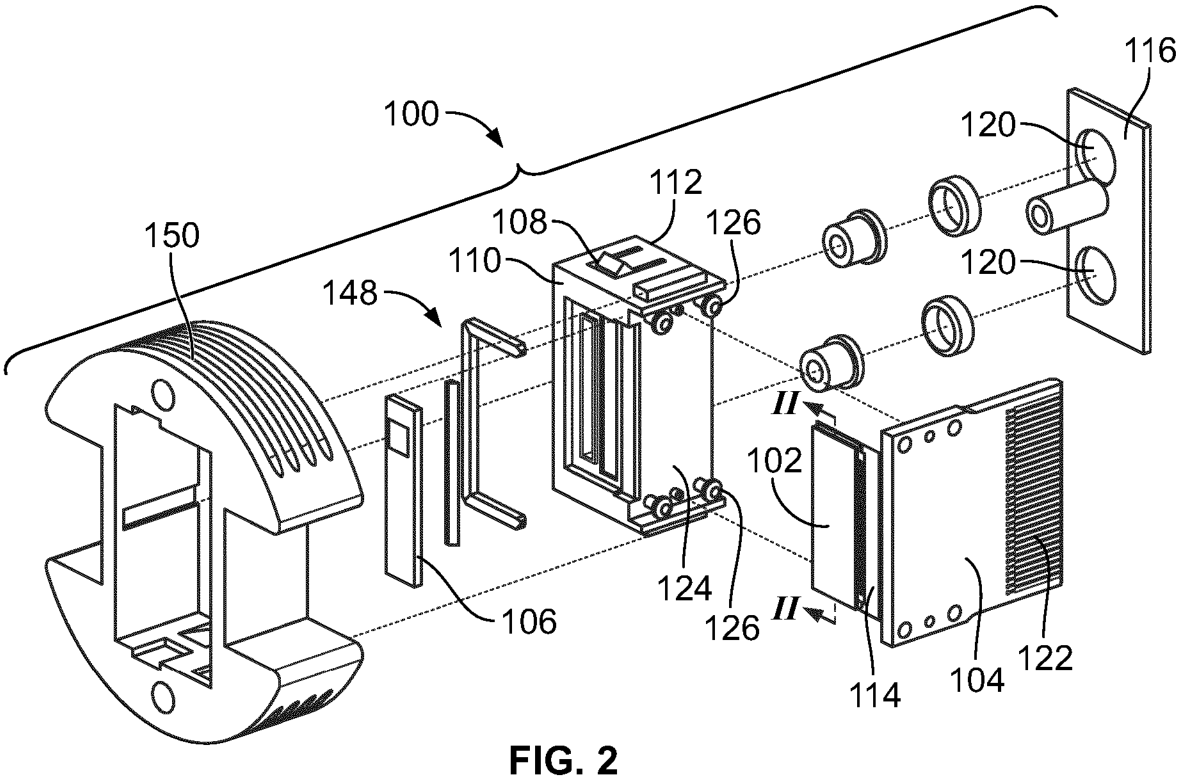
FIG. 2 is an exploded view of the jetting assembly shown in FIG. 1.

Referring now to FIG. 2, an exploded view of jetting assembly 100 is shown, according to an example embodiment. Carrier 108 includes a front-side surface 110, a rear-side surface 112, and a side surface 124. In various embodiments, valve body 102 is attached to front-side surface 110 via an adhesive. The rear-side surface 112 has a cover 116 disposed thereon. Cover 116 includes apertures 120 providing supply ports for fluid (e.g., ink) for deposition onto a target via the valve body 102. For example, in some embodiments, fluid (e.g., ink) is supplied to the valve body 102 via a first one of the apertures 120 (e.g., via an input supply line or hose), circulated through valve body 102, and output from the valve body 102 via a second one of the apertures 120. In other words, the fluid is recirculated through the fluid reservoir. A septum may be positioned in each of the apertures 120 and configured to allow insertion of a fluid delivery or fluid return pin or needle therethrough so as to allow communication of the fluid into the fluid reservoir while maintaining fluidic sealing of the jetting assembly 100. In particular embodiments, the septum may include a single septum sheet which extends below each of the first one and the second one of the apertures. While not shown, in some embodiments, a heating element (e.g., a resistive wire) may be positioned proximate to the valve body 102 or the carrier 108 (e.g., around or coupled to side wall thereof). The heating element may be used to selectively heat the fluid (e.g., ink) contained within the fluid reservoir so as to maintain the fluid at a desired temperature. Furthermore, a temperature sensor (not shown), e.g., a thermal sense resistor, may also be provided in the carrier 108, for example, to determine a temperature of the fluid flowing through the jetting assembly 100.

The front-side surface 110 includes a cavity adapted to receive valve body 102 such that valve body 102 is mounted securely to the front-side surface 110 (e.g., via an adhesive). Circuit board 104 is attached to carrier 108 via the side surface 124. As shown, the side surface 124 includes mounting pegs 126. In various embodiments, circuit board 104 includes apertures arranged in a manner corresponding to the arrangement of the mounting pegs 126 and are adapted to receive the mounting pegs 126 to align the circuit board 104 to the carrier 108.

As shown, circuit board 104 has a flex circuit 114 attached thereto. Flex circuit 114 extends at an angle from circuit board 104 and is attached to the carrier 108 proximate to the front-side surface 110. The valve body 102 and circuit board 104 are arranged perpendicularly to one another, as the flex circuit 114 extends around a corner boundary of front-side surface 110. Circuit board 104 also includes a controller interface 122 including electrical connection members (e.g., pins) configured to receive control signals from a marking system controller.

As described herein, in various embodiments, flex circuit 114 may be disposed between a fluid manifold and the carrier 108 (e.g., between an interposer disposed between the fluid manifold and the carrier 108) to facilitate formation of electrical connections between flex circuit 114 and electrodes of the plurality of micro-valves included in valve body 102. In some embodiments, flex circuit 114 is attached to front-side surface 110 via a mounting member 148. An opening in the flex circuit 114 is aligned with a septum in carrier 108 to provide a fluid inlet to a fluid plenum formed via the valve body 102.

Figure 3:
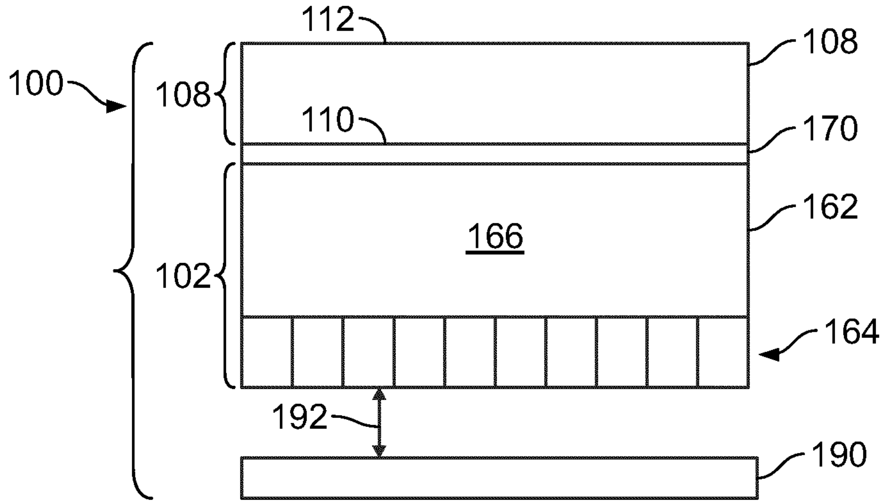
FIG. 3 is a schematic cross-sectional view of the jetting assembly shown in FIG. 1.

Referring now to FIG. 3, a schematic depiction of various components of jetting assembly 100 is shown, according to an example embodiment. For example, FIG. 3 may depict a cross sectional view of jetting assembly 100 at the line I-I shown in FIG. 1. As shown, the valve body 102 extends from front-side surface 110 of the carrier 108 via an interposer 170. The interposer 170 provides structural support to ensure maximal performance of various components in valve body 102. While not shown, in some embodiments a compliant layer (e.g., a silicone or rubber layer) may also be disposed above or below the interposer 170 or any other location in the stack so as to provide stress relief.

The valve body 102 includes an input fluid manifold 162 and a plurality of micro-valves 164 attached to the input fluid manifold 162. The micro-valves 164 and input fluid manifold 162 form a fluid reservoir 166 for fluid (e.g., a combination of ink and makeup fluid) received from a pressurized fluid supply (e.g., via apertures 120 in a cover 116 attached to the rear-side surface 112). In various embodiments, the fluid supply includes a fluid reservoir and a pump configured to provide pressurized fluid to jetting assembly 100 via a supply line coupled to carrier 108. In various embodiments, the fluid supply supplies fluid pressurized between 7 and 15 PSI. For example, in one embodiment, the fluid has a pressure of approximately 10 PSI when one or more of the micro-valves are open. Carrier 108 may include an internal cavity configured to receive the pressurized fluid and deliver the fluid to the reservoir 166. In various embodiments, a pressure differential may be maintained between the fluid reservoir 166 and the fluid supply so as to drive the fluid out of the valve body 102. A pressure sensor may be provided in the valve body 102 and/or the carrier 108 to determine the pressure differential and/or pumping pressure of fluid pumped through the valve body 102.

Input fluid manifold 162 may include a glass structure including a channel forming the fluid reservoir 166. Generally, the micro-valves 164 include actuating beams held in spaced relation to orifices on an orifice plate at the front-side surface 110. The actuating beams may include at least one layer of piezoelectric material configured to deflect in response to receiving control signals (e.g., drive pulses including drive waveforms such as electrical voltage waveforms provided via controller interface 122 on the circuit board 104). As described herein, application of such electrical signals causes the micro-valves 164 to open, which causes droplets to be released at the orifice plate. The droplets advance a throw distance 192 onto a substrate 190 to produce a desired pattern on the substrate 190. In some embodiments, a weight of a single fluid droplet dispensed by a micro-valve 164 or any other micro-valve described herein may be in a range of 200 nanograms to 300 nanograms. In some embodiments, a volume of a single droplet dispensed may be in a range of 200 picoliter to 300 picoliter. The structure and function of various components of micro-valves 164 is described in greater detail herein. In other embodiments, the actuating beam may include a stainless steel actuating beam (e.g., having a length of approximately 1 mm). In still other embodiments, the actuating beam may include a bimorph beam having a two layers of a piezoelectric material disposed on either side of a base layer (e.g., a base silicon or stainless steel layer). An electrical signal (e.g., an electrical voltage) may be applied to either one of the piezoelectric layers so as to urge the actuating beam to bend towards the corresponding piezoelectric layer. The two piezoelectric layers may include the same piezoelectric material or different piezoelectric materials. In particular embodiments, a different electrical signal may be applied to each of the piezoelectric layer so as to bend or curve the actuating beam a predetermined distance towards or away from the orifice.

While embodiments described herein generally describe the actuating beam as including a piezoelectric material, in other embodiments, any other actuation mechanism may be used. For example, in some embodiments, the actuating beams may include a capacitive coupling for moving the actuating beams. In other embodiments, the actuating beams may include an electrostatic coupling. In still other embodiments, the actuating beams may include a magnetic coupling (e.g., an electromagnetic structure activated by an electromagnet) for moving the actuating beam. In yet other embodiments, the actuating beams may comprise a temperature sensitive bimetallic strip configured to move in response to temperature change.

Interposer 170 generally adds rigidity to various portions of the valve body 102. For example, the interposer 170 may be constructed to be more rigid than components (e.g., the orifice plate, the actuating beam, etc.) of valve body 102 to counteract stressed induced by attaching such components to one another. For example, the interposer 170 may be attached to valve body 102 to counteract stresses induced by an adhesive used to attach the carrier 108 to the valve body 102. Additionally, the interposer 170 may counteract stresses at interfaces between the input fluid manifold 162 and micro-valves 164.

Figure 4A:
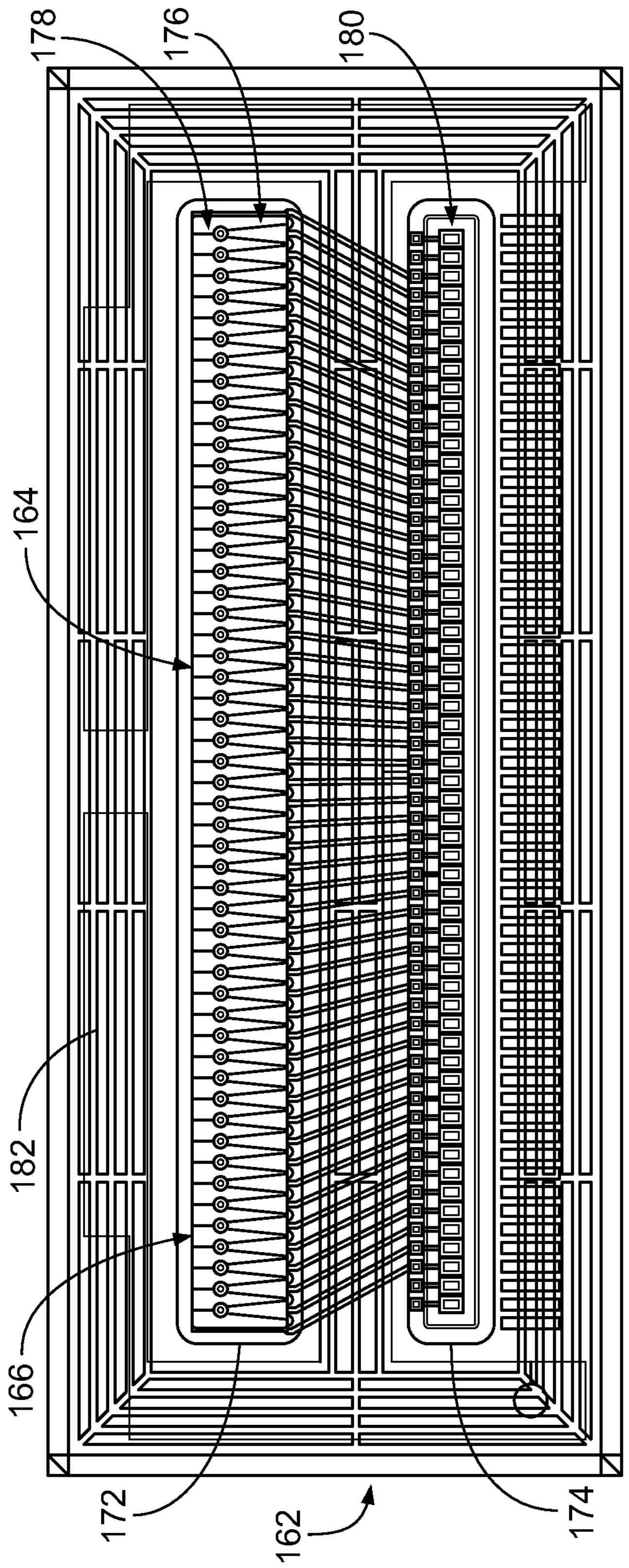
FIG. 4A is a plan view of the jetting assembly shown in FIG. 1.

Referring now to FIG. 4A, a plan view of the jetting assembly 100 is shown, according to an example embodiment. FIG. 4A shows a plan of valve body 102 at the line II shown in FIG. 2. As such, FIG. 4A shows a cross-sectional view at an interface between input fluid manifold 162 and the orifice plate. Input fluid manifold 162 includes a first opening 172 and a second opening 174. The first opening 172 exposes the plurality of micro-valves 164 to form the fluid reservoir 166 configured to hold fluid received from a fluid supply.

In the example shown, the plurality of micro-valves 164 include a plurality of actuating beams 176 aligned in a single row. Each of the plurality of actuating beams 176 has a sealing member 178 disposed at an end thereof. In some embodiments, the sealing members 178 are aligned with and contact valve seats disposed at orifices in the orifice plate to prevent fluid contained in the fluid reservoir 166 from escaping the fluid reservoir 166 in the absence of any electrical signals. The jetting assembly 100 is shown to include 52 actuating beams 176 forming 52 micro-valves 164. In other embodiments, the jetting assembly 100 may include any other number of actuating beams.

In various embodiments, each of the plurality of actuating beams 176 extends from a member disposed underneath a boundary between the first and second openings 172 and 174. Each of said members may include an electrical connection portion exposed via the second opening 174. Electrical contact pads 180 are disposed at each of the electrical connection portions. Wire bonds electrically connect each of the electrical connection portions to the controller interface 122 via electrical contact pads 180. As such, electrical signals may be received by each of the actuating beams 176 via the electrical contact pads 180. In some embodiments tape-automated bonding (TAB) may be used to electrically connect each of the electrical connection portions to the controller interface.

The boundary between the first and second openings 172 and 174 isolates the electrical contact pads 180 from the fluid contained in a reservoir formed by the fluid opening 172. Also beneficially, the electrical contact pads 180 are disposed beneath input fluid manifold 162. This means that electrical connections between actuating beams 176 are disposed on the interior of carrier 108 and are protected from deterioration and external contamination.

To isolate electrical contact pads 180 from the fluid contained in the reservoir 166, an adhesive structure 182 is disposed on input fluid manifold 162. Adhesive structure 182 couples the input fluid manifold 162 to the orifice plate. As shown in FIG. 4A, adhesive structure 182 forms "racetracks" around each of the first and second openings 172 and 174. The racetracks provide barriers for fluid that seeps between the input fluid manifold 162 and the orifice plate as well as prevent particles from entering the input fluid manifold. The racetrack adhesive structure 182 may be present on one or both of the input fluid manifold 162 side or the orifice plate side. For example, the racetracks may be constructed of several concentric loops of an adhesive material (e.g., a negative photo resist such as a bisphenol-A novalac glycidyl ether based photoresist sold under the tradename SU-8 or polymethylmethacrylate, polydimethylsiloxane, silicone rubber, etc.) around each of the first and second openings 172 and 174. In other embodiments, the adhesive structure 182 may be formed from silicon and used to bond the input fluid manifold 162 to the orifice plate via fusion bonding, laser bonding, adhesives, stiction, etc. The adhesive structure 182 may be disposed on the input fluid manifold 162 and the valve body 102 coupled thereto, disposed on the valve body 102 and the input fluid manifold 162 coupled thereto, or disposed on each of the input fluid manifold 162 and the valve body 102 before coupling the two.

Figure 4B:
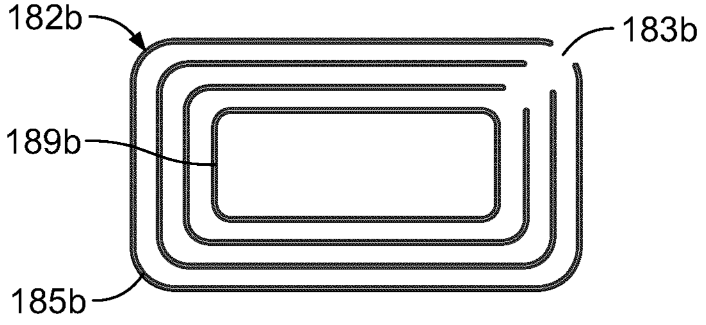
FIG. 4B is a schematic illustration of an adhesive structure that may be used in the jetting assembly of FIG. 1, according to an example embodiment.

In some embodiments, the adhesive structure 182 may be vented. For example, FIG. 4B shows a schematic illustration of an adhesive structure 182*b*. The adhesive structure 182*b* may be formed from SU-8, silicon or any other suitable material and includes a plurality of loops 189*b* such that the adhesive structure has a race track shape. An inner most loop of the plurality of loops 189*b* of the adhesive structure 182*b* that surrounds the input fluid manifold 162 forms a closed loop. In contrast, the remaining of the plurality of loops 189*b* positioned radially outwards of the inner most loop include vents 183*b*, for example, slots or openings defined therein. The vents 183*b* may facilitate bonding of input fluid manifold 162 to the orifice plate by allowing air that may get trapped in between the plurality of loops 189*b* of the adhesive structure 182*b* to escape via the vents 183*b*. While FIG. 4B shows the vents 183*b* being radially aligned with each other and located at corners of each loop, in other embodiments, one or more vents 183*b* of one loop may be radially offset from a vent defined in an adjacent loop, and formed at any suitable location in each of the plurality of loops 189*b*.

As shown in FIG. 4B, corners of the each loop of the adhesive structure 182*b* may be rounded. Furthermore, corners of the input fluid manifold 162, the interposer 170, the flex circuit 114 or any other layers or components included in the jetting assembly 100 may be rounded, for example, to reduce stress concentration that can occur at sharp corners.

Figure 5A:
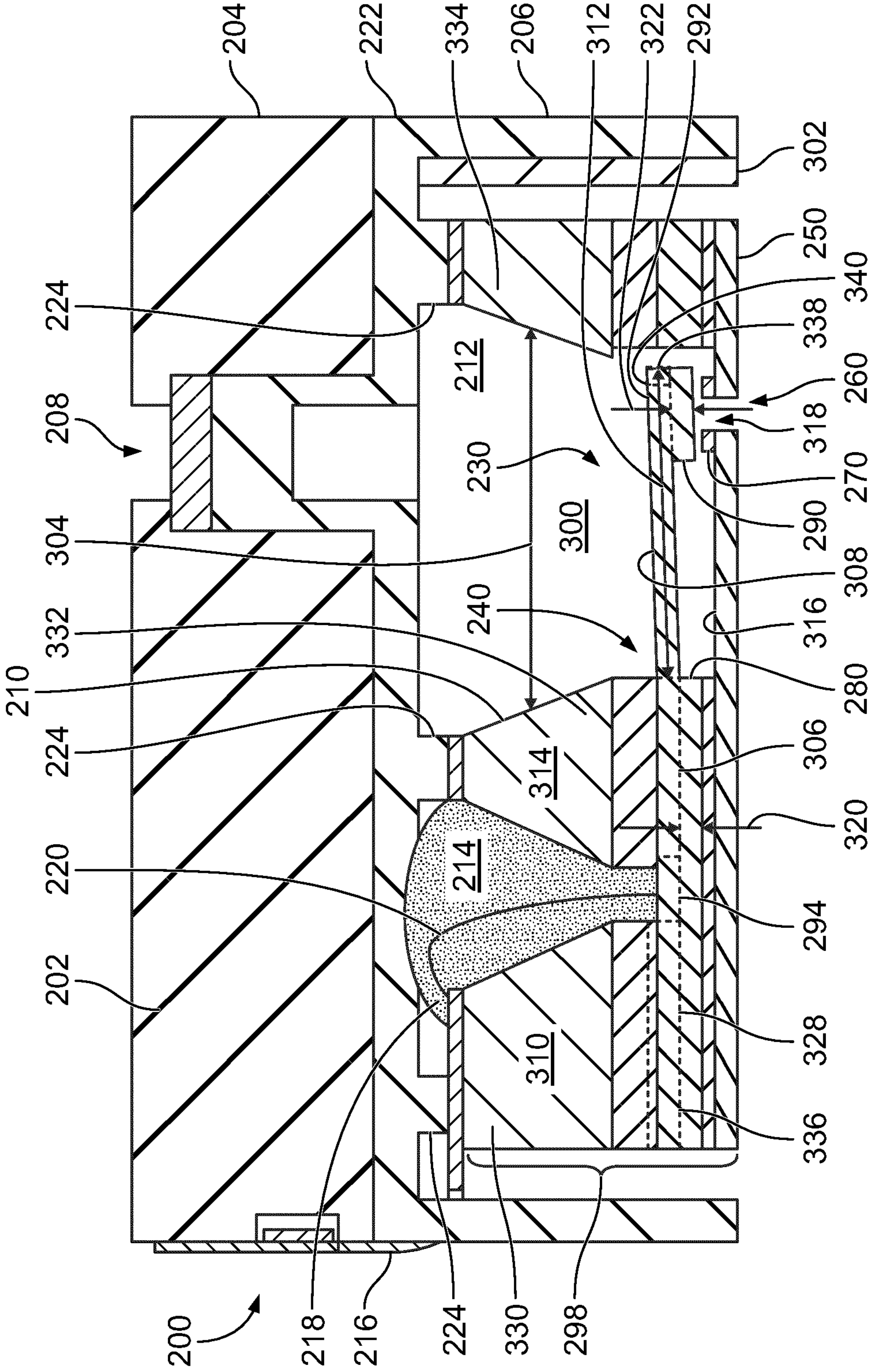
FIG. 5A is a-cross sectional view of a jetting assembly including a micro-valve, according to an example embodiment.

Referring now to FIG. 5A, a cross sectional view of a jetting assembly 200 including a micro-valve 230 is shown, according to an example embodiment. In some embodiments, jetting assembly 200 is an example embodiment of the jetting assembly 100 described with respect to FIGS. 1, 2, 3, and 4A-B. As shown, jetting assembly 200 includes a carrier 202 attached to a valve body 298 via a structural layer 222. In some embodiments, the carrier 202 may include the structural layer 222.

Carrier 202 includes an upper portion 204 and a housing portion 206 extending from an edge of the upper portion 204. Upper portion 204 includes a septum 208 through which pressurized fluid (e.g., ink) is provided. Housing portion 206 defines a cavity into which the valve body 298 is disposed. Valve body 298 includes an input fluid manifold 210 and the micro-valve 230. As shown, input fluid manifold 210 and micro-valve 230 define a reservoir 300 configured to hold a volume of pressured fluid received from an external fluid supply via septum 208. In various embodiments, the pressurized fluid held within the reservoir 300 is a combination of an ink and additional fluids in a liquid state.

Carrier 202 may be formed of plastic, ceramic, or any other suitable material. Carrier 202 facilitates operation of the jetting assembly 200 by providing structural support to valve body 298. For example, in some embodiments, peripheral edges of valve body 298 are attached to housing portion 206 via layers of adhesive 302 disposed at the inner surface of housing portion 206. Such adhesive facilitates maintenance of a desired relative positioning between micro-valve 230 and input fluid manifold 210.

In various embodiments, input fluid manifold 210 is pre-formed prior to its attachment to the additional components of the jetting assembly 200. Input fluid manifold 210 is formed by a body 310 (e.g., formed from glass, silicon, silica, etc.) having any suitable thickness (e.g., 500 microns). As shown, input fluid manifold 210 is pre-formed to include a first arm 330, a second arm 332, and a third arm 334. As used herein, the term “arm,” when used to describe the input fluid manifold 210, is used to describe a structure separating openings contained in the input fluid manifold 210. As such, the arms 330, 332, and 334 may have any suitable shape. For example, in some embodiments, the arms 330, 332, and 334 are substantially rectangular-shaped, having substantially planar side surfaces. In other embodiments, the side surfaces may be angled such that the arms 330, 332, and 334 are substantially trapezoidal-shaped. The arms 330, 332, and 334 may be formed by creating openings in a glass structure using any suitable method (e.g., wet etching or dry etching such as deep reactive ion etching).

As shown, a first channel 212 separates the arms 330 and 332 from one another and a second channel 214 separates the arms 332 and 334 from one another. The first and second channels 212 and 214 are substantially linear and parallel to one another in the shown embodiment, but input fluid manifold 210 may be arranged as needed for the arrangement of micro-valves to be disposed thereon. First channel 212 is formed to have a width 304 bearing a predetermined relationship to a length 312 of a cantilevered portion 308 of an actuating beam 240 of the micro-valve 230, for example, in a range of about 500-1,000 micron. For example, first channel 212 may be formed to have a width 304 greater than a desired length 312 of cantilevered portion 308 by a threshold amount. Second channel 214 provides an avenue for an electrical connection to be formed between the actuating beam 240 and a flex circuit 216 via wire bonds 220 extending in between. Beneficially, using such an arrangement internalizes electrical connections between actuating beam 240 and flex circuit 216. In other words, electrical connections between such components are not external to carrier 202, and are thus less vulnerable to degradation. In various embodiments, the first channel 212 and/or the second channel 214 may have inclined sidewalls.

As shown, second channel 214 is substantially filled with an encapsulant 218. Encapsulant 218 may include an epoxy-type or any other suitable material. Encapsulant 218 envelopes electrical connections formed between wire bonds 220, the flex circuit 216, and actuating beam 240 and is configured to protect the wire bonds 220 from physical damage, moisture and corrosion. Thus, encapsulant 218 ensures the maintenance of an adequate electrical connection between flex circuit 216 and actuating beams 240 to facilitate providing electrical control signals to actuating beams 240 to cause movement thereof for opening and closing the micro-valve 230.

The second arm 332 serves as a barrier preventing fluid contained in the reservoir 300 from reaching the electrical connections. As such, input fluid manifold 210 serves as both part of the reservoir 300 for pressured fluid received from an external fluid supply and an insulating barrier between the pressured fluids and any electrical connections contained within jetting assembly 200. First and second channels 212 and 214 may be formed using any suitable process (e.g., via sandblasting, physical or chemical etching, drilling, etc.). In some embodiments, rather than being constructed of glass, input fluid manifold 210 is constructed of silicon, silica, ceramics or any other suitable material. In some embodiments, the input fluid manifold 210 may be bonded to the micro-valve 230 via glass frit, solder or any other suitable adhesive.

With continued reference to FIG. 5A, micro-valve 230 includes an orifice plate 250 attached to the actuating beam 240. The orifice plate 250 may be formed from any suitable material, for example, glass, stainless steel, nickel, nickel with another layer of electroplated metal (e.g., stainless steel), polyimide (e.g., kapton) or a negative photoresist (e.g., SU-8, polymethylmethacrylate, etc.). Orifice plate 250 is substantially planar and includes an orifice 260 extending between surfaces thereof. In some embodiments, the orifice plate 250 may be substantially flat, for example, have a flatness with a coefficient of variance of less than 3 microns over a length and width of the orifice plate 250 of at least 15 mm, such that the orifice plate 250 is substantially free of bow or twist. Furthermore, the orifice plate 250 may have any suitable thickness. In some embodiments, the orifice plate 250 may have a thickness in a range of 30 microns to 60 microns (30, 40, 50, or 60 microns). In other embodiments, the orifice plate 250 may have a thickness in a range of 100 microns to 400 microns (e.g., 100, 150, 200, 250, 300, 350, or 400 microns). Thicker orifice plates 250 may facilitate realization of a flatter orifice plate.

In various embodiments, the orifice 260 is substantially cylindrical-shaped and has a central axis that is perpendicular or substantially perpendicular to surfaces of orifice plate 250. A valve seat 270 is disposed on an internal surface 316 of orifice plate 250 proximate to orifice 260. In various embodiments, valve seat 270 comprises a compliant material that surrounds or substantially surrounds orifice 260. In some embodiments, valve seat 270 is constructed from an epoxy-based adhesive such as an SU-8 photoresist. In other embodiments, the valve seat 270 may be formed from a moldable polymer, for example, polydimethylsiloxane or silicone rubber. In still other embodiments, the valve seat 270 may be formed from a non-compliant material such as silicon. In some embodiments, a compliant layer, for example, a gold layer may be disposed on a surface of the valve seat 270 which is contacted by the actuating beam 240. Valve seat 270 defines an interior opening 318 substantially aligned with orifice 260 to create an outlet for pressurized fluid contained in the reservoir 300. In particular embodiments, the valve seat 270 might be excluded.

As shown, the actuating beam 240 extends a distance between a first end 336 and a second end 338. Actuating beam 240 includes an end portion 328 extending from the first end 336 to a boundary of the second channel 214. As shown, the end portion 328 is attached (e.g., via an adhesive layer) to the input fluid manifold 210 via a surface of the first arm 330. The end portion 328 is disposed on spacing member 280. As such, the end portion 328 is located between the spacing member 280 and the first arm 330. In various embodiments, the end portion 328 includes each of the layers described with respect to FIGS. 7A-B extending continuously therethrough. However, in alternative embodiments, any of the layers described with respect to FIGS. 7A-B may not be included or include any number of discontinuities within the end portion 328.

Actuating beam 240 further includes an electrical connection portion 294 extending from the end portion 328. As shown, the electrical connection portion 294 extends in a region that corresponds to the second channel 214. In other words, electrical connection portion 294 is located between the spacing member 280 and the channel 214. As shown, the wire bond 220 connects to the actuating beam 240 via the electrical connection portion 294. As described herein, the actuating beam 240 has a wire bond pad disposed thereon at the electrical connection portion 294 to form an electrical connection point. Via the electrical connection point, an electrical signal originating from an external controller travels to the actuating beam 240 via the flex circuit 216 and wire bond 220. As described herein, the electrical signal may result in movement of a cantilevered portion 308 of the actuating beam 240 from a default position. Such a movement may open the fluid outlet defined at the orifice 260 such that fluid contained in the reservoir 300 is ejected from the valve body 298 and onto a desired surface. Various aspects of the electrical connection portion 294 are structured to facilitate operation of the micro-valve 230 in response to the electrical signal.

Actuating beam 240 further includes a base portion 306 extending from the electrical connection portion 294 to a boundary of the second arm 332. As such, input fluid manifold 210 is attached to the actuating beam 240 via an adhesive disposed between the base portion 306 and the second arm 332. In some embodiments, each of the layers described with respect to FIGS. 7A-B extends continuously through the base portion 306. In alternative embodiments, one or more of the layers described with respect to FIGS. 7A-B may not be present within the base portion 306. For example, in one embodiment, the passivation structure 406 and the second electrode portion 404 are not present within the base portion 306. In such an embodiment, the adhesive attaching the actuating beam 240 to the second arm 332 directly contacts the layer of piezoelectric material within the base portion 306. Alternatively, or additionally, any of the layers described with respect to FIGS. 7A-B may include one or more discontinuities (e.g., gaps) within the base portion 306.

The cantilevered portion 308 extends from the base portion 306 into the reservoir 300. Since the base portion 306 is disposed on a spacing member 280, the cantilevered portion 308 is spatially separated from orifice plate 250. Thus, since the cantilevered portion 308 extends into the reservoir 300, there is space on either side of cantilevered portion 308 such that it may bend towards and/or away from the orifice plate 250 as a result of application of the electrical signal thereto via electrical connection portion 294. The spacing member 280 is configured to prevent squeeze film damping of the actuating beam.

Cantilevered portion 308 has a length 312 such that the cantilevered portion 308 extends from a boundary of the reservoir 300 by a predetermined distance. In various embodiments, the predetermined distance is specifically selected such that a portion 292 of cantilevered portion 308 overlaps the valve seat 270 and orifice 260. A sealing member 290 extends from the portion 292 of the actuating beam 240 overlapping orifice 260. In some embodiments, the sealing member 290 is constructed to have a shape that substantially corresponds to a shape of the orifice 260. For example, in one embodiment, both orifice 260 and sealing member 290 are substantially cylindrical-shaped, with sealing member 290 having a larger outer diameter. Such a configuration facilitates sealing member 290 covering orifice 260 in its entirety to enable a seal to be formed between sealing member 290 and valve seat 270. In other embodiments, the orifice 260 may have any other shape, e.g., star shape, square, rectangular, polygonal, elliptical or an asymmetric shape. In particular embodiments, the valve seat 270 may define a recess size and shaped to receive the sealing member 290. In various embodiments, the orifice plate 250 and therefore, the orifice 260 may be formed from a non-wetting (e.g., hydrophobic) material such as silicon or Teflon. In other embodiments, a non-wetting (e.g., hydrophobic) coating may be disposed on an inner wall of the orifice 260. Such coatings may include, for example, Teflon, nanoparticles, an oleophilic coating or any other suitable coating.

In various embodiments, spacing member 280 and sealing member 290 are constructed of the same materials (e.g., silicon, SU-8, silicon rubber, polymethylmethacrylate, etc.) and have equivalent or substantially equivalent thicknesses 320 and 322. In such embodiments, when actuating beam 240 extends parallel to orifice plate 250, lower surfaces of spacing member 280 and sealing member 290 are aligned with one another. When actuating beam 240 is placed into a closed position (as described herein), a surface of sealing member 290 contacts valve seat 270 to close the fluid outlet formed at orifice 260 (e.g., a sealing member surface of the sealing member 290 may be configured to extend approximately 2 microns beneath a lower surface of spacing member 280 if the valve seat 270 were not present). Valve seat 270 and sealing member 290 may be dimensioned such that sufficient surface area of the sealing member 290 contacts valve seat 270 when actuating beam 240 is placed in the closed position (e.g., when an electrical signal is removed from or applied to the actuating beam 240 via wire bonds 220) to prevent fluid from traveling from reservoir 300 to orifice 260. For example, the sealing member 290 may have a larger diameter or otherwise cross-section than the valve seat 270. In some embodiments, a compliant material (e.g., a gold layer) maybe disposed on a surface of the sealing member 290 that is configured to contact the valve seat 270.

Various aspects of the structure of the cantilevered portion 308 are constructed to maximize the durability of the micro-valve 230. In some embodiments, the second electrode portion 404 described with respect to FIGS. 7A-B extends continuously through substantially the entirety of the cantilevered portion 308. Such a structure provides maximal overlap between the second electrode and a layer of piezoelectric material within the cantilevered portion 308 such that electric signal may be applied to substantially the entirety of the cantilevered portion 308 to maximize the piezoelectric response. Because the cantilevered portion 308 extends into the reservoir 300, the fluid contained within the reservoir 300 will contact the actuating beam 240. The fluid contained within the reservoir 300 (e.g., any suitable combination of ink and makeup fluid) may corrode various materials out of which the actuating beam 240 is constructed. For example, in some embodiments, the electrodes contained in the actuating beam (e.g., the second electrode in the second electrode portion 404 described with respect to FIGS. 7A-B) may be constructed of a material (e.g., platinum or gold) that corrodes in response to contact with the fluid. Thus, to ensure durability of the micro-valve, steps are taken to isolate the electrodes from the fluid. For example, the passivation structure 406 described with respect to FIGS. 7A-B may be disposed on the second electrode such that the passivation structure 406 completely covers the second electrode.

To allow this to occur, the actuating beam 240 may be constructed such that a delimiting (e.g., outer circumferential) boundary of the second electrode is disposed inward of a delimiting boundary of the actuating beam 240. For example, the layer of piezoelectric material contained within the actuating beam 240 may extend outward of the second electrode, and the passivation structure 406 may be disposed on the second electrode such that the passivation structure 406 completely covers the second electrode. In other words, an end 340 of the cantilevered portion 308 may not include the second electrode layer to facilitate complete passivation of the actuating beam 240.

Various aspects of jetting assembly 200 are designed to ensure formation of an adequate seal between valve seat 270 and sealing member 290. For example, structural layer 222 disposed on input fluid manifold 210 prevents bowing of orifice plate 250 resulting from stressed induced thereon via adhesives coupling components of micro-valve 230 to one another and the micro-valve 230 to housing portion 206. In various embodiments, structural layer 222 is constructed to have a greater rigidity than orifice plate 250 to perform this function. Structural layer 222 may be constructed of silicon or any other suitable material. As shown, structural layer 222 includes protruding portions 224 extending from a main portion thereof. Protruding portions 224 are attached to an upper surface of input fluid manifold 210 (e.g., at boundaries of first and second channels 212 and 214). In certain embodiments, protruding portions 224 are omitted. A seal is formed at protruding portions 224 via, for example, an adhesive disposed between structural layer 222 and flex circuit 216. Protruding portions 224 provide clearance above the input fluid manifold 210. Such clearance facilitates disposal of encapsulant 218 that completely covers all points of contact between wire bond 220 and flex circuit 216. In some embodiments, the carrier 202 may include the structural layer 222 such that the stiffness is provided by the carrier 202.

In another aspect, actuating beam 240 is constructed such that a tight seal is formed at the interface between the valve seat 270 and the sealing member 290 when in the closed position. Actuating beam 240 may include at least one layer of piezoelectric material. The layer of piezoelectric material may include lead zirconate titanate (PZT) or any suitable material. The layer of piezoelectric material has electrodes electrically connected thereto. In various embodiments, wire bonds 220 are attached to said electrodes such that electrical signals from flex circuit 216 are provided to the layer of piezoelectric material via the electrodes. The electrical signals cause the actuating beam 240 to move (e.g., bend, turn, etc.) with respect to its default position. In other embodiments, the actuating beam 240 may include a stainless steel actuating beam (e.g., having a length of approximately 1 mm). In still other embodiments, the actuating beam 240 may include a bimorph beam having a two layers of a piezoelectric material disposed on either side of a base layer (e.g., a base silicon layer). An electrical signal (e.g., an electrical voltage) may be applied to either one of the piezoelectric layers so as to urge the actuating beam 240 to bend towards the corresponding piezoelectric layer. The two piezoelectric layers may include the same piezoelectric material or different piezoelectric materials. In particular embodiments, a different electrical signal may be applied to each of the piezoelectric layer so as to bend or curve the actuating beam a predetermined distance.

As shown, wire bonds 220 are attached to actuating beam 240 at an electrical connection portion 294 thereof. Electrical connection portion 294 includes a wire-bonding pad (e.g., constructed of gold or platinum) conductively connected to at least one electrode within actuating beam 240. Beneficially, electrical connection portion 294 is separated from the cantilevered portion of actuating beam 240. In other words, electrical connection portion 294 is separated from the fluid contained in jetting assembly 200 via seals formed at the points of connection between input fluid manifold 210 and actuating beam 240. In some embodiments, the wire bonds 220 and/or the encapsulant 218 may be routed out through an opening provided in the orifice plate 250.

In various embodiments, actuating beam 240 is constructed such that the closed position is its default position. In other words, various layers in the actuating beam 240 are constructed such that the actuating beam curves towards orifice 260 as a result of force supplied via pressured fluid contained in the fluid reservoir 212. A tuning layer within actuating beam 240 may be constructed to be in a state of compressive stress to cause a curvature in actuating beam towards the orifice. As a result of such curvature, sealing member 290 contacts valve seat 270, for example, in the absence of any electrical signals applied to the actuating beam 240 to close the fluid plenum. The degree of curvature may be specifically selected to form a tight seal at the interface between sealing member 290 and valve seat 270 with the actuating beam 240 in the default position. Beneficially, such a default seal prevents evaporation of the fluid contained in jetting assembly 200, which prevents clogging and other defects.

The actuating beam 240, as shown in FIG. 5A, is bent away from orifice plate 250. Accomplishment of such a bend results from application of an electrical signal to actuating beam 240 via flex circuit 216. For example, flex circuit 216 may be electrically connected to an external controller supplying electrical signals relayed to actuating beam 240.

As illustrated by FIG. 5A, application of the electrical signal causes the actuating beam 240 to temporarily depart from its default position. For example, in various embodiments, the actuating beam 240 moves upward away from orifice 260 such that a portion of a sealing member surface of sealing member 290 is at least 10 microns from an upper surface of valve seat 270. In one embodiment, a central portion of the sealing member surface is approximately 15 microns from the valve seat 270 at a peak of its oscillatory pattern. As a result, an opening is temporarily formed between valve seat 270 and sealing member 290. The opening provides a pathway for a volume of fluid to enter orifice 260 to form a droplet at an exterior surface of the orifice plate 250. The droplets are deposited onto a substrate to form a pattern determined via the control signals supplied to each of the actuating beams 240 of each of the micro-valves 230 of jetting assembly 200. As will be appreciated, the frequency with which the actuating beam 240 departs from its default position to a position such as the one shown in FIG. 5A may vary depending on the implementation. In various embodiments, the natural frequency of the actuating beams 240 may be in a range of a 1-30 kHz, and may be dependent on a length, a width, a thickness and/or a stiffness of the actuating beam 240. For example, in one embodiment, the actuating beam 240 oscillates at a frequency of approximately 12 kHz. However, the actuating beam 240 may oscillate at a smaller (e.g., 10 kHz) or larger frequency (e.g., 20 kHz) in other implementations.

Figure 5B:
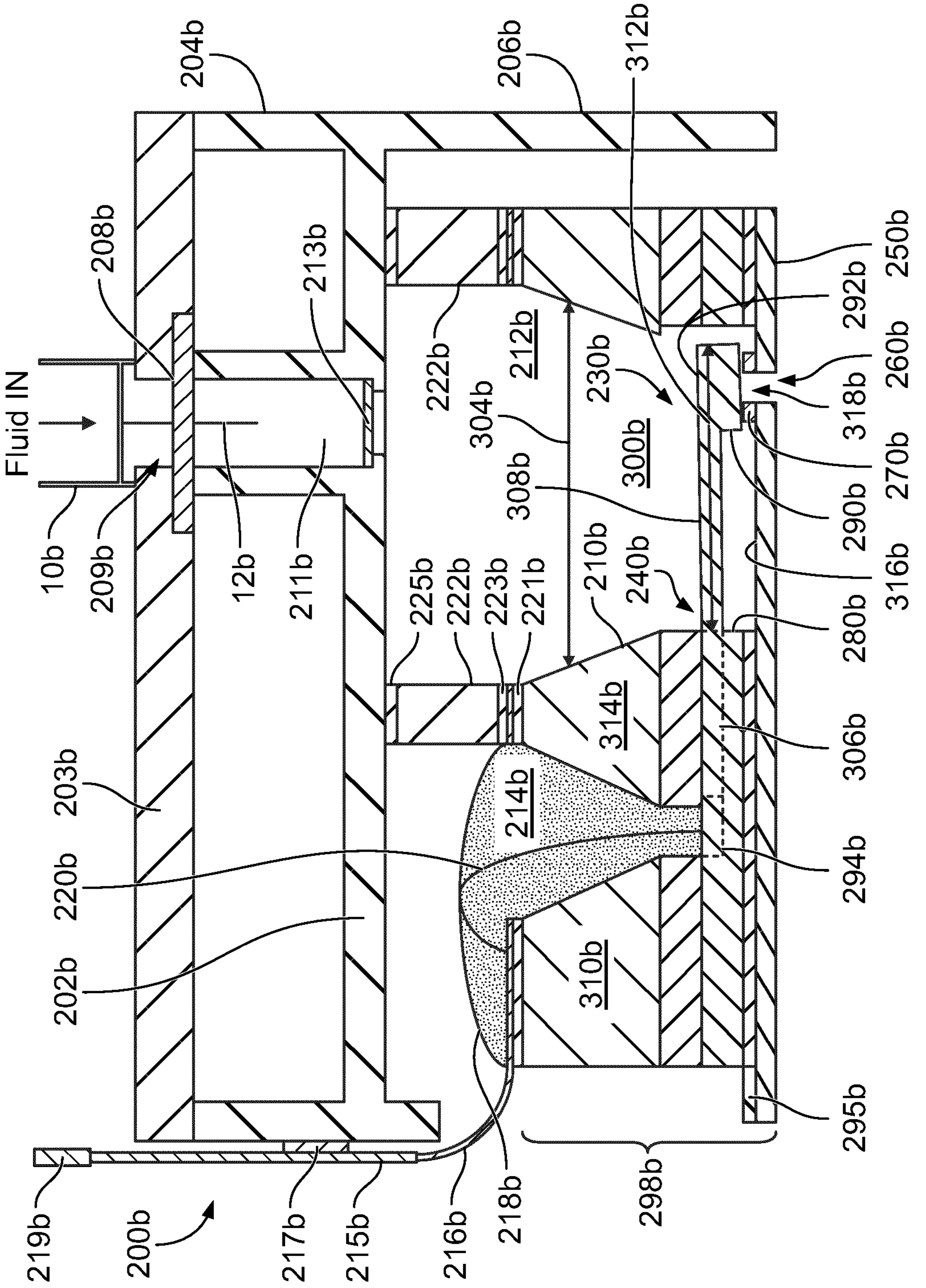
FIG. 5B is a-cross sectional view of a jetting assembly including a micro-valve, according to another example embodiment.

Referring now to FIG. 5B, a cross sectional view of a jetting assembly 200*b* including a micro-valve 230*b* is shown, according to an example embodiment. In some embodiments, jetting assembly 200*b* is an example embodiment of the jetting assembly 100 described with respect to FIGS. 1, 2, 3, and 4A-4B. As shown, jetting assembly 200*b* includes a carrier 202*b* attached to a valve body 298*b* via an interposer 222*b*.

Carrier 202*b* includes an upper portion 204*b* and a housing portion 206*b* extending from an edge of upper portion 204*b*. A fluid channel 211*b* is provided in the upper portion 204*b*. A septum 208*b* (e.g., a rubber or foam septum) is positioned at an inlet of the fluid channel 211*b* and a filter 213*b* is positioned at an outlet of the fluid channel 211*b*. A cover 203*b* (e.g., a plastic or glass cover) is positioned on the carrier 202*b* such that the septum 208*b* is positioned between the carrier 202*b* and the cover 203*b*, and secured therebetween. An opening 209*b* may be defined in the cover 203*b* and corresponds to the inlet of the fluid channel 211*b*. A fluid connector 10*b* is coupled to the cover 203*b* or the inlet of the fluid channel 211*b*. The fluid connector 10*b* includes an insertion needle 12*b* configured to pierce the septum 208*b* and be disposed therethrough in the fluid channel 211*b*. The fluid connector 10*b* is configured to pump pressurized fluid (e.g., ink) into an input fluid manifold 210*b* of the jetting assembly 200*b* via the insertion needle 12*b*. Furthermore, the filter 213*b* is configured to filter particles from the fluid before the fluid is communicated into the reservoir 300*b*. In some embodiments, the insertion needle 12*b* may be formed from or coated with a non-wetting (e.g., a hydrophobic material such as Teflon). In other embodiment, the insertion needle 12*b* may include heating elements, or an electric current may be provided to the insertion needle 12*b* so as to heat the insertion needle 12*b* and thereby, the fluid flowing therethrough into the reservoir 300*b*. In still other embodiments, metallic needles or any other heating element may be provided in the input fluid manifold 210*b* for heating the fluid contained therein. While shown as only including the fluid channel 211*b*, in some embodiments, the carrier 202*b* may also define a second fluid channel for allowing the fluid to be drawn out of the carrier 202*b*, i.e., cause the fluid to be circulated through the carrier 202*b*.

The housing portion 206*b* defines a cavity or a boundary within which the valve body 298*b* is disposed. Valve body 298 includes the input fluid manifold 210*b* and the micro-valve 230*b*. As shown, input fluid manifold 210*b* and micro-valve 230*b* define the fluid reservoir 300*b* configured to hold a volume of pressured fluid received from an external fluid supply via the septum 208*b*. In various embodiments, the pressurized fluid held within the fluid reservoir 300*b* is a combination of an ink and additional fluids in a liquid state.

In various embodiments, input fluid manifold 210*b* is pre-formed prior to its attachment to the additional components of the jetting assembly 200*b*. Fluid manifold 210*b* may be formed by a glass body 310*b* having any suitable thickness (e.g., 500 microns). As shown, input fluid manifold 210*b* is pre-formed to include a first channel 212*b* and a second channel 214*b*. First channel 212*b* is formed to have a width 304*b* bearing a predetermined relationship to a length 312*b* of a cantilevered portion 308*b* of an actuating beam 240*b* of the micro-valve 230*b*. Second channel 214*b* provides an avenue for an electrical connection to be formed between the actuating beam 240*b* and a flex circuit 216*b* via wire bonds 220*b* extending in between.

As shown, second channel 214*b* is substantially filled with an encapsulant 218*b*. The encapsulant 218*b* ensures the maintenance of an adequate electrical connection between flex circuit 216*b* and actuating beams 240*b* to facilitate providing electrical control signals to actuating beams 240*b* to cause movement thereof to open and close micro-valve 230*b*, and protects a wire-bond 220*b* from physical damage or moisture, as previously described herein.

The portion 314*b* of input fluid manifold 210*b* separating the first and second channels 212*b* and 214*b* serves as a barrier preventing fluid contained in the reservoir 300*b* from reaching the electrical connections. As such, input fluid manifold 210*b* serves as both part of the reservoir 300*b* for pressurized fluid received from an external fluid supply and an insulating barrier between the pressurized fluids and any electrical connections contained within jetting assembly 200*b*.

The micro-valve 230*b* includes an orifice plate 250*b* attached to actuating beam 240*b*. Orifice plate 250*b* is substantially planar and includes an orifice 260*b* extending between surfaces thereof. A valve seat 270*b* is disposed on an internal surface 316*b* of orifice plate 250*b* proximate to orifice 260*b*. Valve seat 270*b* defines an interior opening 318*b* substantially aligned with orifice 260*b* to create an outlet for pressurized fluid contained in the reservoir 300*b*. In particular embodiments, the valve seat 270*b* might be excluded. In some embodiments, the orifice plate 250*b* or any other orifice plate described herein may also be grounded. For example, an electrical ground connector 295*b* (e.g., a bonding pad such as a gold bond pad) may be provided on the orifice plate 250*b* and configured to allow the orifice plate 250*b* to be electrically ground (e.g., via electrical coupling to a system ground).

The actuating beam 240*b* includes a base portion 306*b* and a cantilevered portion 308*b*. Base portion 306*b* extends underneath the portion 314*b* of input fluid manifold 210*b* separating the first and second channels 212*b* and 214*b*. As shown, the base portion 306*b* includes an electrical connection portion 294*b* in a region that overlaps with the second channel 214*b*. Electrical connection portion 294*b* includes an electrode through which an electrical connection is formed with flex circuit 216*b* via wire bonds 220*b*. The cantilevered portion 308*b* extends into the reservoir 300*b* from the portion 314*b* of input fluid manifold 210*b*. As shown, cantilevered portion 308*b* is disposed on a spacing member 280*b* and, as a result, is spatially separated from orifice plate 250*b*.

Cantilevered portion 308*b* has a length 312*b* such that the cantilevered portion extends from a boundary of the reservoir 300*b* by a predetermined distance. In various embodiments, the predetermined distance is specifically selected such that a portion 292*b* of cantilevered portion 308*b* overlaps the valve seat 270*b* and orifice 260*b*. A sealing member 290*b* extends from the portion 292*b* of the actuating beam 240*b* overlapping the orifice 260*b*. In some embodiments, sealing member 290*b* is constructed to have a shape that substantially corresponds to a shape of orifice 260*b*.

The flex circuit 216*b* is positioned on the glass body 310*b* and the portion 314*b* of the input fluid manifold 210*b*, and coupled thereto via a first adhesive layer (e.g., SU-8, silicone rubber, glue, epoxy, etc.). An interposer 222*b* is positioned between the upper portion 204*b* of the carrier 202*b* and the input fluid manifold 210*b* so as to create a gap between the upper portion 204*b* and the input fluid manifold 210*b*. This allows sufficient space for disposing the encapsulant 218*b* and increases a volume of the input fluid manifold 210*b*. As shown in FIG. 5B, the interposer 222*b* is positioned on and coupled to a portion of the flex circuit 216*b* via a second adhesive layer 223*b* (e.g., SU-8, silicone, or any other adhesive). Furthermore, the interposer 222*b* is coupled to a side wall of the upper portion 204*b* of the carrier 202*b* proximate to the micro-valve 230*b* via a third adhesive layer 225*b* (e.g., SU-8, silicone, or any other adhesive).

The interposer 222*b* may be formed from a strong and rigid material (e.g., plastic, silicon, glass, ceramics, etc.) and disposed on input fluid manifold 210*b* so as to prevent bowing of the orifice plate 250*b* resulting from stressed induced thereon via adhesives coupling components of micro-valve 230*b* to one another and the micro-valve 230*b* to housing portion 206*b*. In various embodiments, interposer 222*b* is constructed to have a greater rigidity than orifice plate 250*b* to perform this function.

In another aspect, actuating beam 240*b* is constructed such that a tight seal is formed at the interface between valve seat 270*b* and sealing member 290*b* when in the closed position. Actuating beam 240*b* may include at least one layer of piezoelectric material (e.g., lead zirconate titanate (PZT) or any suitable material). The layer of piezoelectric material has electrodes electrically connected thereto and wire bonds 220*b* are attached to said electrodes such that electrical signals from flex circuit 216*b* are provided to the layer of piezoelectric material via the electrodes. The electrical signals cause the actuating beam 240*b* to move (e.g., bend, turn, etc.) with respect to its default position.

As shown, wire bonds 220*b* are attached to actuating beam 240*b* at an electrical connection portion 294*b* thereof, substantially similar to the wire bonds 220 described with respect to the jetting assembly 200 of FIG. 5A. In various embodiments, actuating beam 240*b* is constructed such that the closed position is its default position, as described in detail with respect to the actuating beam 240 of FIG. 5A.

The actuating beam 240*b*, as shown in FIG. 5B, is bent away from orifice plate 250. Accomplishment of such a bend results from application of an electrical signal to actuating beam 240*b* via flex circuit 216*b*. For example, flex circuit 216*b* may be electrically connected to a circuit board 215*b* (e.g., a printed circuit board) extending perpendicular to a longitudinal axis of the actuating beam 240*b* along a sidewall of the carrier 202*b*. An identification tag 217*b* (e.g., the identification tag 106) may be positioned between the circuit board 215*b* and the sidewall of the carrier 202*b*. An electrical connector 219*b* is electrically coupled to the circuit board 215*b* and configured to electrically connect the flex circuit 216*b* to an external controller supplying electrical signals relayed to actuating beam 240*b* via the circuit board 215*b*.

As illustrated by FIG. 5B, application of the electrical signal causes the actuating beam 240*b* to temporarily depart from its default position. For example, in various embodiments, the actuating beam 240*b* moves upward away from orifice 260*b* such that a portion of a sealing member surface of sealing member 290*b* is at least 10 microns from an upper surface of valve seat 270*b*, as described in detail with respect to the actuating beam 240 of FIG. 5A.

Figure 6:
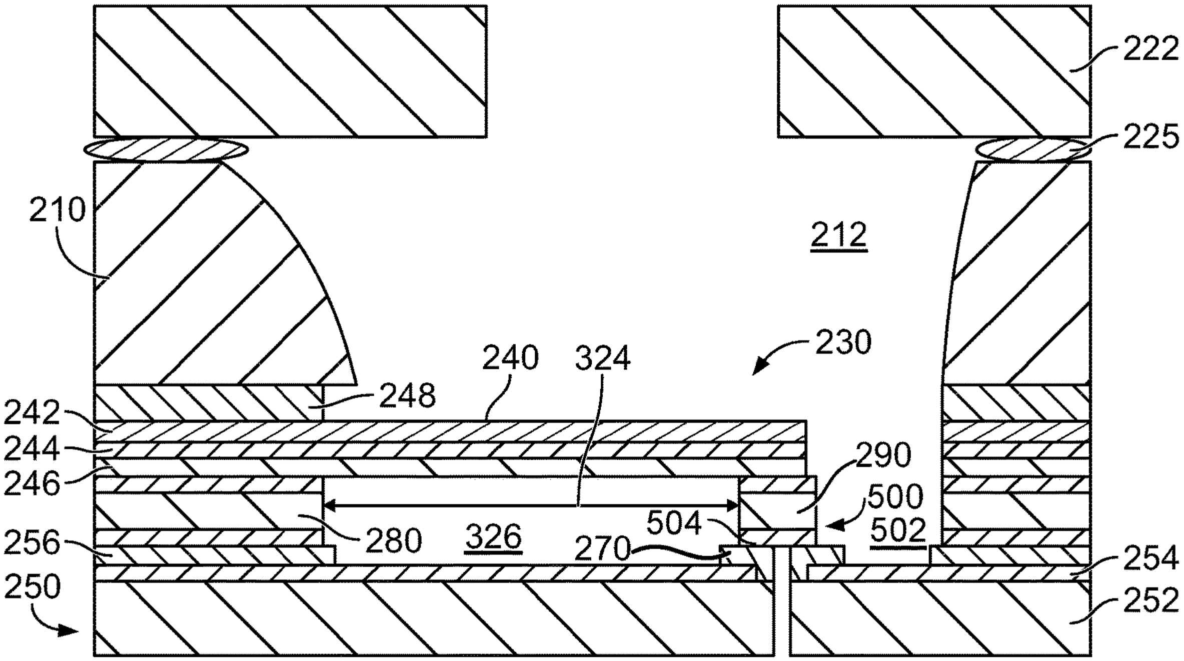
FIG. 6 is cross-sectional view providing a more detailed view of the jetting assembly shown in FIG. 5A.

Referring now to FIG. 6, a more detailed view showing various components of jetting assembly 200 described with respect to FIGS. 5A-B is shown, according to an exemplary embodiment. As shown, actuating beam 240 includes an actuating portion 242, a tuning layer 244, and a non-active layer 246. Non-active layer 246 serves as a base for the tuning layer 244 and the actuating portion 242. The structure of actuating portion 242 and the tuning layer 244 are described in greater detail with respect to FIGS. 7A-B. In some embodiments, non-active layer 246 is constructed from silicon or any other suitable material. In some embodiments, non-active layer 246, the spacing member 280, and sealing member 290 are all constructed from the same material (e.g., monolithically formed from a silicon wafer). In an example embodiment, non-active layer 246, the spacing member 280, and sealing member 290 are formed from a double silicon-on-insulator (SOI) wafer.

Spacing member 280 is shown to include an intermediate layer located between two peripheral layers. In an example embodiment, the intermediate layer and non-active layer 246 comprise two silicon layers of a double SOI wafer, with the peripheral layers disposed on either side of the intermediate layer including silicon oxide layers. In this example, the sealing member 290 and spacing member 280 are formed through etching the surface of the double SOI wafer opposite the actuating portion 242. Oxide layers serve to control or stop the etching process once, for example, the entirety of the intermediate layer forming the spacing member 280 is removed in a region separating the spacing member 280 and sealing member 290. Such a process provides precise control over both the width and thickness of the spacing and sealing members 280 and 290.

As will be appreciated, the size of sealing member 290 may contribute to the resonance frequency of actuating beam 240. Larger amounts of material disposed at or near an end of actuating beam 240 generally results in a lower resonance frequency of actuating beam. Additionally, such larger amounts of material may impact the actuating beam 240's default curvature induced from pressurized fluid contacting actuating beam 240. Accordingly, the desired size of sealing member 290 impacts various other design choices of actuating beam 240. Such design choices are described in greater detail with respect to FIGS. 7A-B. In some embodiments, the sealing member 290 is sized based on the dimensions of orifice 260. In some embodiments, the sealing member 290 is substantially cylindrical and has a diameter approximately 1.5 times that of the orifice 260. For example, in one embodiment, sealing member 290 has a diameter of approximately 90 microns when the orifice 260 has a diameter of approximately 60 microns. Such a configuration facilitates alignment between sealing member 290 and orifice 260 such that sealing member 290 completely covers orifice 260 upon contacting valve seat 270. In another embodiment, the sealing member 290 is sized such that it has a surface area that approximately doubles that of the orifice 260 (e.g., the spacing member 280 may have a diameter of approximately 150 microns, with the orifice 260 being approximately 75 microns in diameter). Such an embodiment provides greater tolerance for aligning sealing member 290 and orifice 260 to facilitate creating the seal between valve seat 270 and sealing member 290. In other embodiments, the diameter of the sealing member 290 may be 2 times, 2.5 times, 3 times, 3.5 times or 4 times to the diameter of the orifice 260. In various embodiments, a ratio of a length to diameter of the orifice 260 may be in range of 1:1 to 15:1. The ratio may influence shape, size and/or volume of a fluid droplet ejected through the orifice and may be varied based on a particular application.

Beneficially, the gap 324 between spacing member 280 and sealing member 290 creates a volume of separation 326 between actuating beam 240 and orifice plate 250. The volume of separation 326 prevents squeeze film damping of oscillations of actuating beam 240. In other words, insufficient separation between orifice plate 250 and actuating beam 240 would lead to drag resulting from fluid having to enter and/or exit the volume of separation 326 as the actuating beam 240 opens and closes the orifice 260. Having the greater volume of separation produced via spacing member 280 reduces such drag and therefore facilitates actuating beam 240 oscillating at faster frequencies.

With continued reference to FIG. 6, orifice plate 250 includes a base layer 252 and intermediate layer 254. For example, in one embodiment, base layer 252 comprises a silicon layer and intermediate layer 254 includes a silicon oxide layer. In the embodiment shown, a portion of the intermediate layer 254 proximate to orifice 260 is removed and a first portion of the valve seat 270 is disposed directly on base layer 252 and a second portion of the valve seat 270 is disposed on the intermediate layer 254. It should be understood that, in alternative embodiments, intermediate layer 254 extends all the way to boundaries of orifice 260 and valve seat 270 is disposed on intermediate layer 254. In still other embodiments, the removed portion of the intermediate layer 254 may have a cross-section equal to or greater than a cross-section of the valve seat 270 such that the valve seat 270 is disposed entirely on the base layer 252.

Due to the criticality of the spatial relationship between spacing member 280 and valve seat 270, attachment of spacing member 280 to orifice plate 250 may be performed in a manner allowing precise control over the resulting distance between actuating beam 240 and orifice plate 250. As shown, an adhesive layer 256 is used to attach spacing member 280 to orifice plate 250. In various embodiments, a precise amount of epoxy-based adhesive (e.g., SU-8, polymethylmethacrylate, silicone, etc.) is applied to intermediate layer 254 prior to placement of the combination of spacing member 280 and actuating beam 240 thereon. The adhesive is then cured to form an adhesive layer 256 having a precisely controlled thickness. For example, in some embodiments, a lower-most surface of spacing member 280 is substantially aligned with an upper surface of valve seat 270. Any desired relationship between such surfaces may be obtained to create a relationship between sealing member 290 and valve seat 270 that creates an adequate seal when actuating beam 240 is in the default position. In various embodiments, the adhesive layer 256 and the valve seat 270 may be formed from the same material (e.g., SU-8) in a single photolithographic process.

In various embodiments, once the actuating beam 240 and orifice plate 250 are attached to one another via adhesive layer 256 (e.g., to form a micro-valve 230), an additional adhesive layer 248 is applied to the periphery of the actuating beam 240. The additional adhesive layer 248 is used to attach input fluid manifold 210 to actuating beam 240.

In the example shown with respect to FIG. 6, the micro-valve 230 includes a sealing structure 500 including various components through which a seal is formed to separate the orifice 260 from a volume proximate the actuating beam 240. In the example shown, the sealing structure 500 includes the sealing member 290 and the valve seat 270. As described herein, the actuating beam 240 is configured such that an orifice-facing surface of the sealing member 290 contacts an upper surface of the valve seat 270 to form a seal at the interface between the valve seat 270 and the sealing member 290. The seal isolates the orifice 260 from the channel 212 such that minimal fluid escapes the jetting assembly 200 when no electrical signals are applied to the actuating beam 240. In other embodiments, the valve seat 270 may be excluded such that the orifice facing surface of the sealing structure 500 contacts the orifice plate 250 so as to fluidly seal the orifice 260.

Figure 7A:
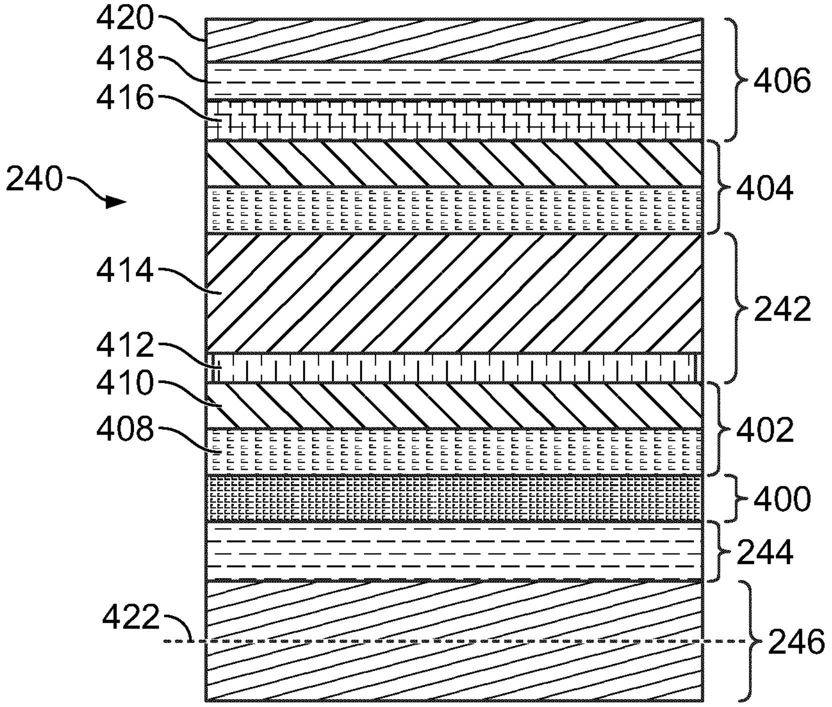
FIG. 7A is a cross-sectional view of an actuating beam of a micro-valve, according to an example embodiment.

Referring now to FIG. 7A, a more detailed view of actuating beam 240 is shown, according to an example embodiment and not to scale. As shown, actuating beam 240 includes the non-active layer 246, the tuning layer 244, a barrier layer 400, a first electrode portion 402, the actuating portion 242, a second electrode portion 404, and a passivation structure 406. As will be appreciated, actuating beam 240 may include more or fewer layers in various alternative embodiments.

In some embodiments, tuning layer 244 is disposed directly on non-active layer 246. Tuning layer 244 generally serves as an adhesion layer for facilitating deposition of the additional layers described herein. Additionally, as described herein, a thickness of tuning layer 244 may play a critical role in determining an overall curvature in actuating beam 240 when in its default position. Speaking generally, tuning layer 244 is configured to have a predetermined tuning stress such that in the closed position, the sealing member 290 of the actuating beam 240 contacts and exerts a force on the valve seat 270 so as to fluidly seal the orifice 260. In some embodiments, in the absence of an electrical signal, the predetermined tuning stress is configured to cause the actuating beam 240 to curve towards the orifice 260 such that in the absence of the valve seat 270, the sealing member surface of the sealing member 290 would be positioned a predetermined distance (e.g., 2 microns) beneath a lower surface of the spacing member 280. For example, the tuning layer 244 may be placed into a state of compressive stress as a result of the deposition of the additional layers described herein. As such, the thicker tuning layer 244 is, the greater curvature of actuating beam 240 towards orifice 260 when in its default position. In one example embodiment, the tuning layer 244 is constructed of silicon dioxide.

Barrier layer 400 acts as a barrier against diffusion of materials contained in the first piezoelectric layer 414 to the tuning layer 244. If left unchecked, such migration will lead to harmful mixing effects between constituent materials in the layers, adversely impacting performance. In various embodiments, barrier layer 400 is constructed of, for example, zirconium dioxide. As shown, first electrode portion 402 includes an adhesion layer 408 and a first electrode 410. The adhesion layer 408 facilitates deposition of the first electrode 410 on barrier layer 400 and prevents diffusion of matter in the first electrode 410 to other layers. In various embodiments, adhesion layer 408 is constructed of titanium dioxide. First electrode 410 may be constructed of platinum, gold, rubidium, or any other suitable conductive material to provide a conductive pathway for electrical signals to be provided to actuating portion 242. In some embodiments, first electrode portion 402 is only included in select portions of actuating beam 240. For example, first electrode portion 402 may only be included proximate to and/or within the electrical connection portion 294.

Actuating portion 242 may be formed from a single or multiple layers of any suitable piezoelectric material. In the example shown, active portion includes a growth template layer 412 and a piezoelectric layer 414. Growth template layer 412 serves as a seed layer facilitating growth of the piezoelectric layer 414 having a desired texture (e.g., the {001} crystal structure and corresponding texture) to ensure maximal piezoelectric response. In some embodiments, growth template layer 412 is constructed of lead titanate. Piezoelectric layer 414 may be constructed of any suitable material such as lead zirconate titanate (PZT).

Piezoelectric layer 414 may be deposited using any method, such as, utilizing vacuum deposition or sol-gel deposition techniques. In some embodiments, piezoelectric layer 414 may have a thickness in a range of approximately 1-6 microns (e.g., 1, 2, 3, 4, 5, or 6 microns, inclusive) and is adapted to produce a deflection at an end of actuating beam 240 of approximately 10 microns when an electrical signal is applied thereto. A deflection of 10 microns (e.g., such that a surface of sealing member 290 departs from valve seat 270 by slightly less than that amount) may be sufficient to produce droplets at orifice 260 having a desired size. In some embodiments, piezoelectric layer 414 has a piezoelectric transverse coefficient (d31 value) magnitude of approximately 140 to 160 pm/V. This value may enable adequate deflection of actuating beam 240 to be generated via electrical signals supplied to first and second electrode portions 402 and 404.

As shown, second electrode portion 404 is disposed on actuating portion 242. In various embodiments, second electrode portion 404 is structured similarly to first electrode portion 402 described herein. Application of a voltage to the first electrode portion 402 and/or second electrode portion 404 thus induces a strain in piezoelectric layer 414, causing the cantilevered portion 308 to bend away from the orifice plate 250. Through application of periodic control signals to first and second electrode portions 402 and 404, periodic cycling of actuating beam 240 generates droplets output from orifice 260 at a desired frequency. While FIG. 7A shows the first and second electrode portions 402 and 404 overlapping each other, in other locations, the first and second electrode portions 402 and 404 may not overlap. This may limit or prevent electron leakage between the first and second electrode portions 402 and 404 which can damage the piezoelectric layer 414 or cause electrical shorts.

In various embodiments, the electrodes contained in first and second electrode portions 402 and 404 are deposited in a non-annealed state. As a result, the electrodes are deposited in a substantially compressive state, which impacts the overall curvature of actuating beam 240 when in a default position. The mode of deposition of piezoelectric layer 414 may impact the compressive state of the electrodes. For example, in some circumstances, where the piezoelectric layer 414 is deposited (e.g., via a vapor deposition technique) and later cured at a predetermined temperature (e.g., approximately 700 degrees C.), the curing may cause the electrode 410 to anneal and become removed from the compressive state. Such a removal impacts the overall balancing of stresses in actuating beam 240, which changes its default curvature. Accordingly, it may be beneficial to use a low-temperature deposition process for piezoelectric layer 414 (e.g., a low-temperature sol-gel deposition process or plasma-enhanced chemical vapor deposition process) to prevent the reversal of stresses in the electrodes. In various embodiments, second electrode portion 404 may be annealed at a higher temperature than the first electrode portion 402, for example, to create a predetermined tuning stress in the tuning layer 244.

The materials shown in FIG. 7A may extend substantially entirely through the length of actuating beam 240. As such, there is an overlap between electrode portions 402 and 404 and the reservoir formed via micro-valve 230. In various embodiments, the fluid contained in the reservoir is electrically conductive and/or corrosive to the materials forming the first and second electrode portions 402 and 404. Thus, it is preferable to isolate electrode portions 402 and 404 from the reservoir to prevent the fluid contained in the reservoir from contacting electrode portions 402 and 404.

In this regard, the passivation structure 406 is configured to perform such isolation. In the example shown, passivation structure 406 includes a dielectric layer 416, an insulator layer 418, and a barrier layer 420. Barrier layer 420 may be constructed of silicon nitride, which acts as a diffusion barrier against water molecules and ions contained in the fluid to prevent corrosion of electrode portions 402 and 404. In some embodiments, insulator layer 418 includes a silicon dioxide layer having a compressive stress that roughly counterbalances the tensile stress in barrier layer 420. Dielectric layer 416 may be constructed of aluminum oxide to prevent oxidation of the additional layers contained in actuating beam 240. In some embodiments, an additional metal layer is disposed on barrier layer 420. For example, the metal layer may be constructed of Talinum oxide or any other suitable, chemically-resistant metal to further enhanced the protective properties of passivation structure 406. In particular embodiments, the barrier layer 420 may be formed from Teflon or parylene. In other embodiments, at least a portion of the actuating beam 240, i.e., the structure formed by the layers shown in FIG. 7 may be covered or over coated by a Teflon or parylene layer. Such an overcoat may prevent micro-cracks from forming in the layers of the actuating beam 240. In still other embodiments, the over coat may include a metallic layer, for example, a tantalum or palladium layer.

The addition of the passivation structure 406 may significantly impacts the default positioning of actuating beam 240. This is so because passivation structure 406 is offset from a neutral axis 422 of compression of the actuating beam 240. As shown, the neutral axis 422 is within the non-active layer 246, which means that the electrode portion 404 and passivation structure 406 are the most distant therefrom in actuating beam 240. Given this, the tensile or compressive stresses induced in such layers will greatly influence the default curvature of actuating beam 240. As such, the thickness of tuning layer 244 is selected based on the structure of various constituent layers of passivation structure 406.

Figure 7B:
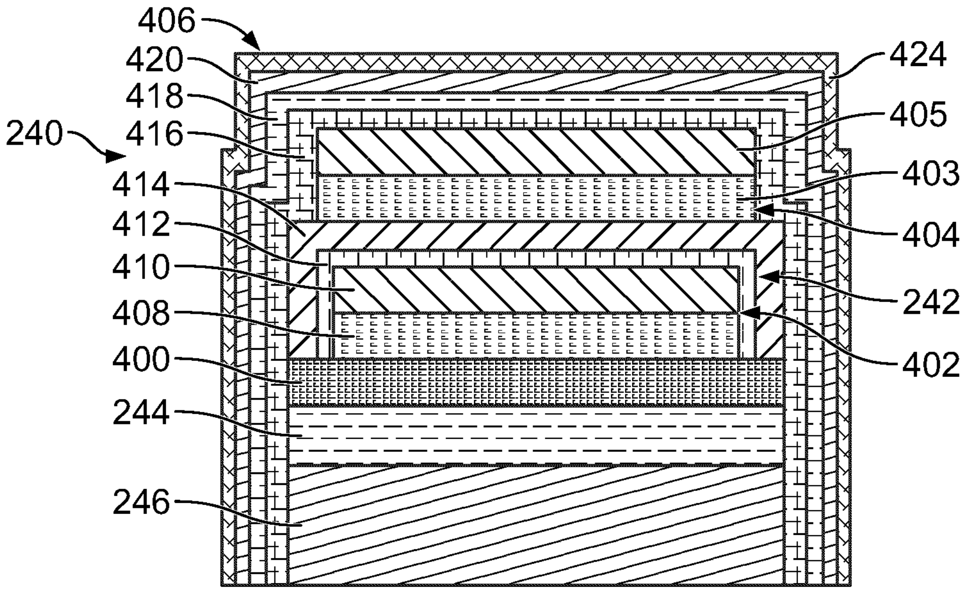
FIG. 7B is a front cross-sectional view of the actuating beam of FIG. 7A, according to another example embodiment.

FIG. 7B is front cross-sectional view of the actuating beam 240 showing an arrangement of each of the layers included in the actuating beam 240, according to an example embodiment and not to scale. As shown, actuating beam 240 includes the non-active layer 246, the tuning layer 244 and a barrier layer 400, as described with respect to FIG. 7A. The first electrode portion 402 includes the adhesion layer 408 (e.g., titanium oxide) positioned on the barrier layer 400, and a conductive layer or electrode 410 (e.g., platinum, gold, rubidium, etc.) positioned thereon. The first electrode portion 402 is configured to have a width which is less than a width of the barrier layer 400 such that ends of the electrode portion 402 in a direction perpendicular to a longitudinal axis of the actuating beam 240 are located inwards of the ends of the barrier layer 400 in the same direction.

The actuating portion 242 including the seed layer 412 and the piezoelectric layer 414 is conformally disposed on the first electrode portion 402 so as to extend beyond the lateral ends of the first electrode portion 402 and contact the barrier layer 400. In this manner the piezoelectric layer completely surrounds or encapsulates at least the portion of the first electrode portion 402 which overlaps or is proximate to the second electrode portion 404. The second electrode portion 404 includes an adhesion layer 403 (e.g., titanium) and a conductive layer 405 (e.g., platinum, gold, rubidium, etc.). In some embodiments, the second electrode portion 404 may include only the conductive layer 405 disposed directly on the piezoelectric layer 414 (i.e., the adhesion layer 403 is omitted). Since the actuating portion 242 overlaps and extends beyond the ends of the first electrode portion 402, the actuating portion effectively electrically isolates the first electrode portion 402 from the second electrode portion 404, so as to prevent electron leakage and current migration which may be detrimental to the performance of the actuating beam 240.

The passivation structure 406 conformally coats exposed portions of each of the other layers 246, 244, 400, 402, 242 and 404. However, a bottom surface of the non-active layer 246 may not be coated with the passivation structure 406. The passivation structure 406 may include a dielectric layer 416, an insulator layer 418, a barrier layer 420, and a top passivation layer 424. Barrier layer 420 may be constructed of silicon nitride, which acts as a diffusion barrier against water molecules and ions contained in the fluid to prevent corrosion of electrode portions 402 and 404. Silicon nitride, however, is generally in a state of tensile stress once deposited on the remaining layer. Insulator layer 418 is configured to counterbalance such tensile stress. For example, in some embodiments, insulator layer 418 includes a silicon dioxide layer having a compressive stress that roughly counterbalances the tensile stress in barrier layer 420. In various embodiments, the barrier layer 420 may be positioned beneath the insulator layer 418. Dielectric layer 416 may be constructed of aluminum oxide, titanium oxide, zirconium oxide or zinc oxide to prevent oxidation of the additional layers contained in actuating beam 240. Thus, passivation structure 406 serves to prevent both corrosion and oxidation—two major sources of defects caused by the presence of fluids—in actuating beam 240, and thus ensures long-term performance of micro-valve 230. Furthermore, the top passivation layer 424 is disposed on the barrier layer 420 and may include a Teflon or parylene layer. Such an overcoat may prevent micro-cracks from forming in the layers of the actuating beam 240, and may also prevent the underlying layer from a plasma discharge (e.g., which the buried layers may be exposed to in subsequent fabrication operations). In particular embodiments, the top passivation layer 424 may include a metallic layer, for example, a tantalum or palladium layer. In some embodiments, an additional metal layer is disposed on barrier layer 420. For example, the metal layer may be constructed of Talinum oxide or any other suitable, chemically-resistant metal to further enhanced the protective properties of passivation structure 406.

Figure 8:
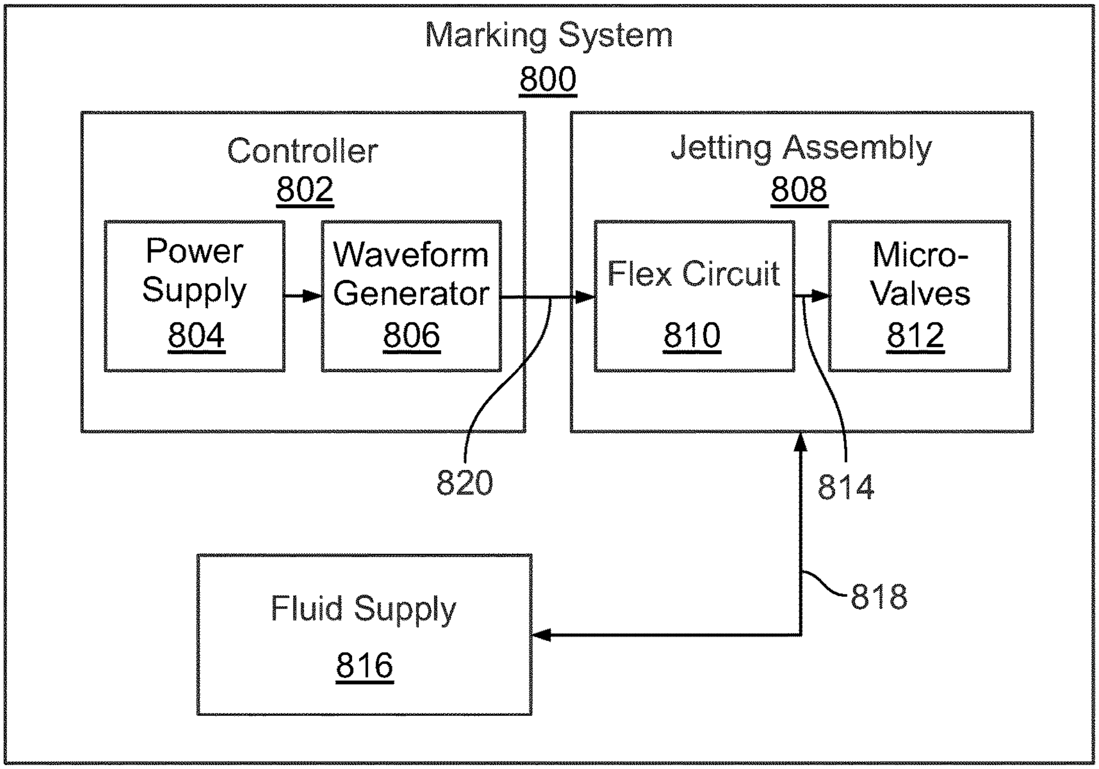
FIG. 8 is a block diagram of a marking system including a jetting assembly, according to an example embodiment

FIG. 8 shows a block diagram of a marking system 800, according to an example embodiment. The marking system 800 is shown to include a controller 802, a jetting assembly 808, and a fluid supply 816. Jetting assembly 808 may be constructed in a manner similar to the jetting assembly 200 described with respect to FIGS. 5A-B and 6 herein. As such, the jetting assembly 808 includes a plurality of micro-valves 812. Each of the micro-valves 812 includes an actuating beam (e.g., the actuating beam 240 or 240*b*) including a cantilevered portion that overlaps an orifice (e.g., the orifice 260 or 260*b*) in an orifice plate (e.g., the orifice plate 260 or 260*b*). The cantilevered portions are movable from a closed position in which sealing members attached to the cantilevered portions contact corresponding orifices or valve seats that surround corresponding orifices in response to control signals being received at electrical connection portions of the actuating beams. The control signals may include a drive pulse defining a drive waveform.

Such control signals may be supplied by the controller 802. Controller 802 may be external to the marking device including the jetting assembly 808. For example, controller 802 may be attached to a circuit board conductively connected to the micro-valves 812 (e.g., via a flex circuit 810) for providing separate control signals to each of the micro-valves 812. Alternatively, in some embodiments, the controller 802 is included within the marking device and disposed within the same housing as jetting assembly 808.

The controller 802 is shown to include a power supply 804 and a waveform generator 806. Power supply 804 may include a battery or any other suitable power supply. The waveform generator 806 includes an electrical circuit configured to generate control signals for the micro-valves 812. In some embodiments the waveform generator 806 is programmable. For example, in some embodiments, the waveform generator 806 includes a processor and a memory. The memory may store waveform parameters and instructions executable by the processor to generate waveforms having characteristics determined based on the parameters. The controller 802 may connect to an external computing device such that a user may adjust the parameters for specific ones of the micro-valves. By adjusting the parameters, various qualities of the drive waveform (e.g., voltage levels, pulse duration, etc.) may be adjusted based on the application. Waveform generator 806 may generate a plurality of individually adjustable waveforms for supply to each of the micro-valves via electrical connection lines 820. Alternatively, the same control signal may be provided to each of the micro-valves 812.

The controller 802 is conductively connected to the flex circuit 810. For example, the connection lines 820 may connect to a circuit board attached to a carrier associated with the jetting assembly 808. The circuit board may include a plurality of conductive pathways for each of the micro-valves 812, which may be attached to the flex circuit 810. As described herein, the flex circuit 810 may be electrically connected to electrical connection portions of each of the actuating beams of the micro-valves 812 via wire bonds. As such, via the flex circuit 810 and connection lines 820, control signals may be provided to each of the micro-valves 812. Marking system 800 is shown to include a fluid supply 816. Fluid supply 816 may be external to the marking device and fluidly coupled to the jetting assembly 808 via a fluid conduit 818. Fluid supply 816 may include a pump for providing pressurized fluid to the jetting assembly 808. The fluid may be pressurized at 3 PSI, 5 PSI, 7 PSI, 10 PSI, or any other suitable pressure. As described herein, jetting assembly 808 may include a valve body including a reservoir configured to receive the pressurized fluid. The reservoir may be in fluid communication with the orifices in the orifice plate when the actuating beams are removed from the closed position described herein. As such, when the control signals provided by the controller 802 reach the actuating beams of the micro-valves 812, the actuating beams depart from the closed position to render the orifices in temporary fluid communication with the reservoir. With the actuating beams in an open position, droplets are ejected from the jetting assembly 808 through the orifices. Thus, by controlling the frequency with which the actuating beams depart from the closed position, the controller 802 determines the frequency at which drops are emitted from the jetting assembly 808.

The actuating beams described herein oscillate in response to voltages above a threshold value being applied thereto. In certain embodiments, the threshold value is between 10 and 20 volts. In an example embodiment, the actuating beam 240 (or at least the cantilevered portion 308) oscillates response to a 20 volt control signal being applied thereto. During such an oscillation, the actuating beam 240 departs from the closed position, reaches a peak position (such as the position shown in FIGS. 5A-B), returns to the closed position, and repeats a similar cycle any number of times. It should be noted that this oscillation occurs in response to application of a steady-state control signal (e.g., a direct current control signal) to the actuating beam 240.

Figure 9:
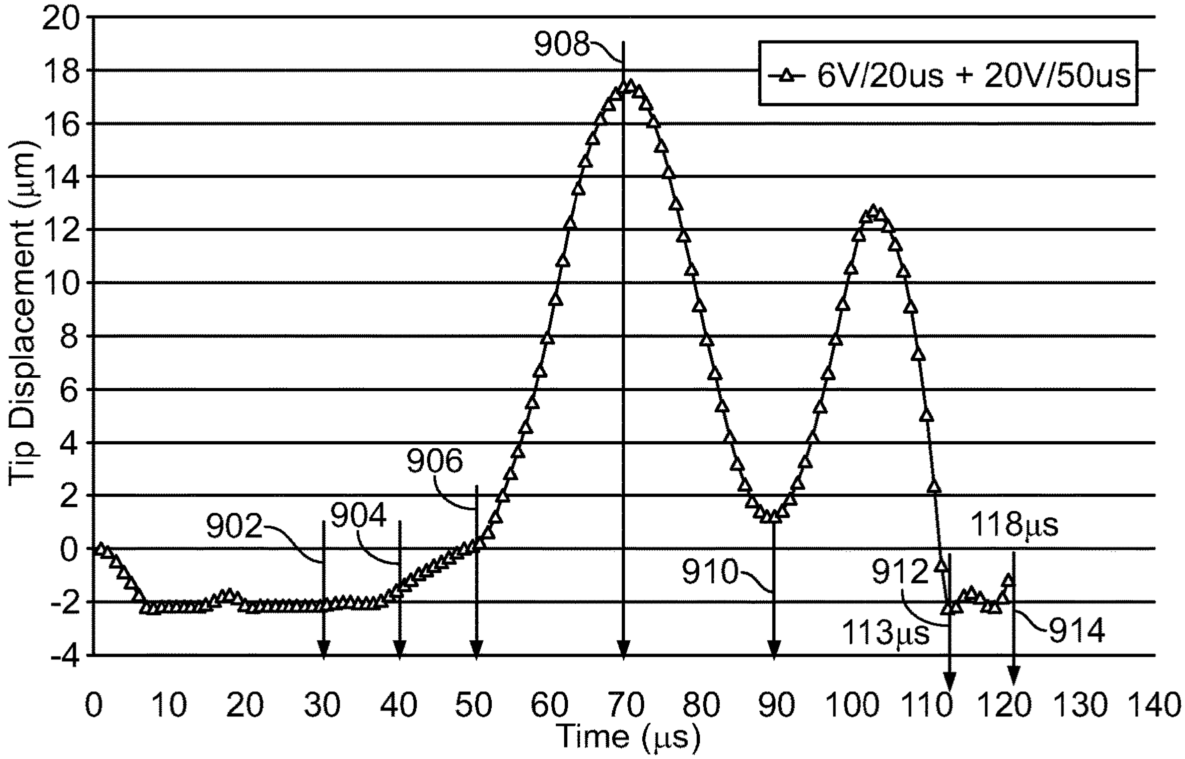
FIG. 9 is a chart depicting the displacement of an actuating beam in response to application of a control signal, according to an example embodiment.
Figure 10:
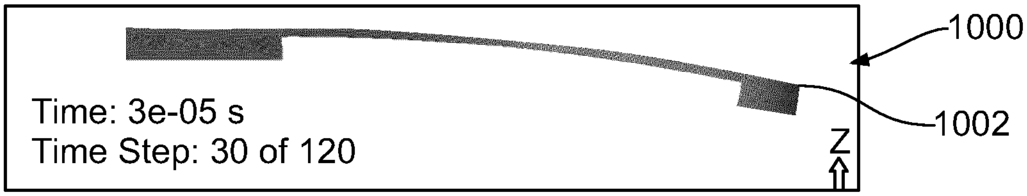
FIG. 10-16 shows positions of an actuating beam at various points in time during application of a control signal thereto, according to an example embodiment.
Figure 11:
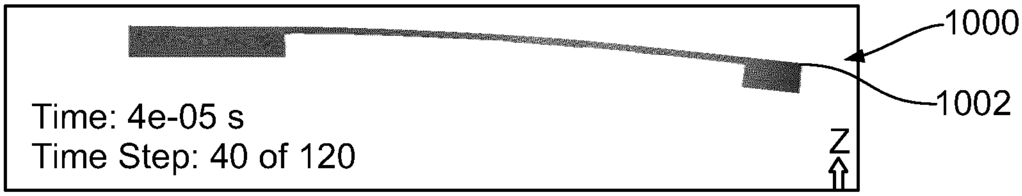
Figure 12:
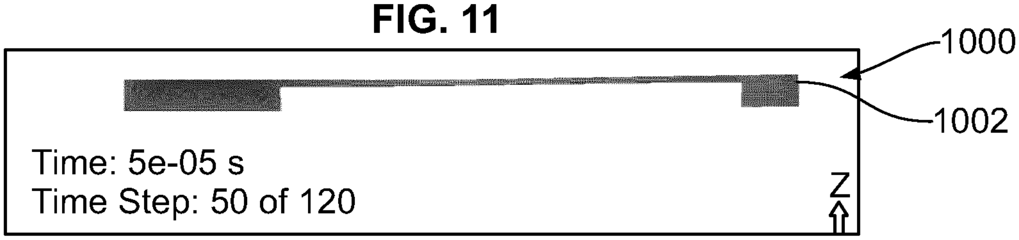

FIG. 9 shows an example oscillation pattern of an actuating beam 1000 in response to a control signal being applied thereto. FIG. 9 shows a displacement of a tip 1002 of an actuating beam 1000 as a function of time (e.g., at points in time 902, 904, 906, 908, 910, 912, and 914). The actuating beam 1000 and tip 1002 are depicted at the points in time 902, 904, 906, 908, 910, 912, and 914 in FIGS. 10, 11, 12, 13, 14, 15, and 16, respectively. As shown, at 902, the tip 1002 is at or slightly below a default position. The point 902 may correspond to a point in time in which a control signal at a baseline or bias voltage is applied to the actuating beam 1000. As shown, the bias voltage is approximately 6 volts. In alternative embodiments, the bias voltage is 10 volts or more. In still other embodiments, the bias voltage may include a negative bias voltage. The tip 1002 remains substantially at the default position until 906, where an upswing portion of the drive waveform begins. During the upswing portion, the control signal voltage rises from the baseline or bias voltage to a predetermined drive pulse voltage.

Figure 13:
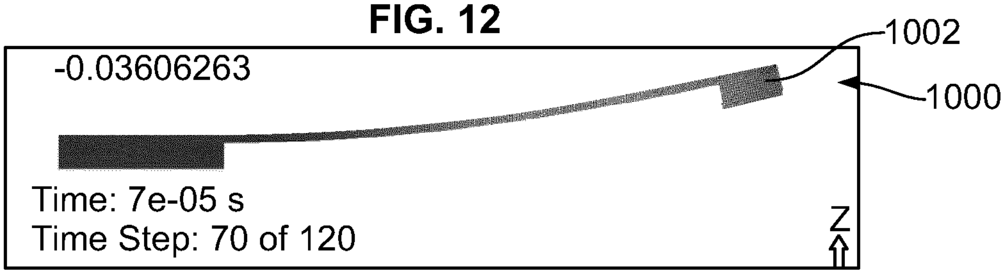
Figure 14:
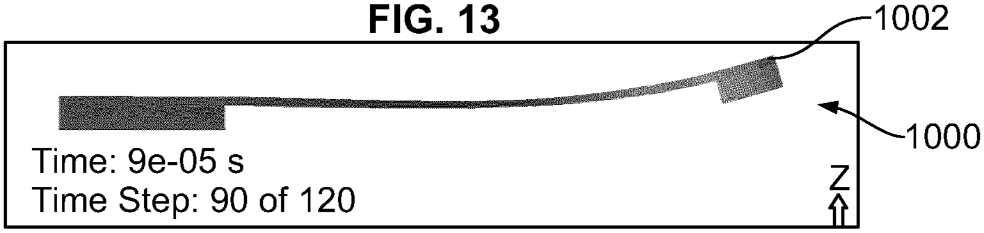
Figure 15:
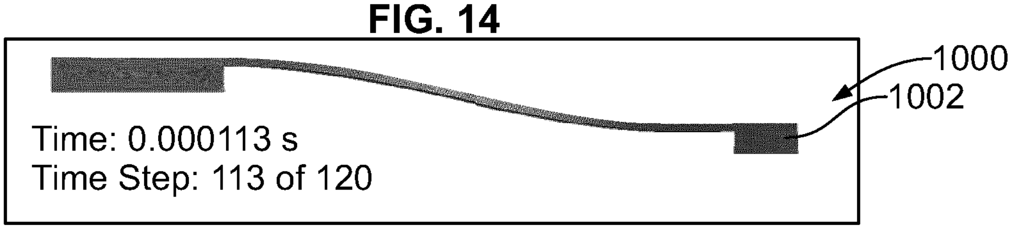
Figure 16:
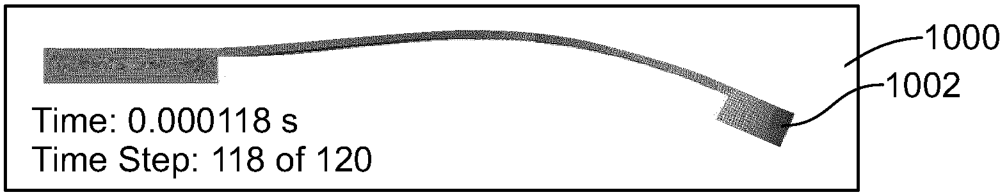

Between 906 and 908, the actuating beam 1000 bends at a substantially linear rate. Shortly after 906, the drive signal may include a drive pulse which may reach a driving portion, where the control signal voltage reaches a predetermined drive voltage. In the example shown, the drive voltage is approximately 20 volts. In other embodiments, the drive voltage is 35 volts or higher. As shown, at 908, the tip 1002 reaches a peak position, where the distance between the actuating beam 1000 (and any sealing members attached thereto) and the orifice reaches a maximal value. As depicted in FIG. 13, at 908, a lower surface of the sealing member is displaced from the default position by approximately 16 microns.

Between 908 and 910, the curve of the actuating beam 1000 reverses directions such that the tip 1002 approaches the default position and substantially reaches the default position at 910. Between 910 and 912, during which the drive waveform is still in the driving portion, the actuating beam oscillates again, but reaches a peak position slightly lower than that at 908. As such, the oscillation between 910 and 912 has a slightly smaller period than the oscillation occurring between 906 and 910. After 912, the drive waveform returns to the bias voltage, and the actuating beam slightly oscillates around the baseline value, which is reached at 918.

As shown in this example, during the driving portion of the drive waveform (e.g., approximately between 906 and 912 in FIG. 9), the actuating beam 1000 oscillates multiple times. During these oscillations, the actuating beam 1000 departs from its default position, reaches a peak position, and returns to a point proximate to the default position. The initial oscillation after the drive pulse portion begins results in the largest peak value and the largest oscillation period. The values of this oscillation period may depend on various structural features of the actuating beam 1000 (e.g., the thicknesses of various layers, the final shape of any sealing member disposed thereon, etc.).

Because of these oscillations, the duration or length of the drive pulse is critical. If the drive pulse ends at a point in time proximate to when the actuating beam reaches a peak position (e.g., proximate to the point 908 described with respect to FIG. 9), the actuating beam 1000 will quickly recoil back to the default position. As a result, the actuating beam 1000 strongly impacts against the orifice plate, which produces unwanted vibrations and disturbs operation of the incorporating micro-valve. These unwanted effects can be mitigated, by controlling a drive pulse ON time to have a period still at a time point where the actuating beam 1000 returns to its default position (e.g., proximate to the point 910 shown in FIG. 9) with a relatively soft impact. This way, cutting of the drive pulse does not result in a strong impact of the actuating beam 1000 against the orifice plate, allowing the micro-valve to operate smoothly. The drive pulse ON time may be followed by a drive pulse OFF time, which may be configured to allow the actuating beam to stabilize in the closed position. The drive pulse OFF time may be less than the drive pulse ON time. In particular embodiments, the drive pulse OFF time may be at least 20% of the drive pulse duration (i.e., a total drive pulse time including the drive pulse ON time and the drive pulse OFF time).

Figure 17:
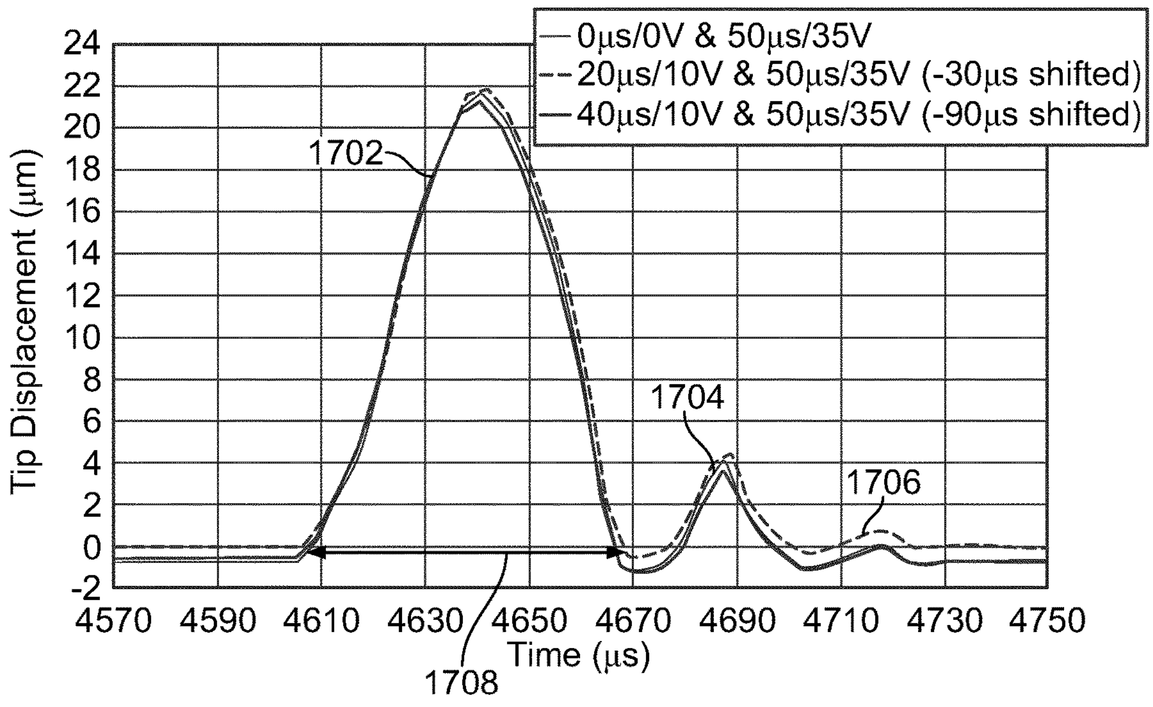
FIG. 17 is a chart depicting the displacement of an actuating beam in response to application of various drive waveforms, according to an example embodiment.

FIG. 17 shows a chart of a tip displacement vs. time for an actuating beam with control signals having different waveforms applied thereto. As shown, three different waveforms are applied to the actuating beam. Each of the waveforms includes a 50 microsecond drive pulse ON time at 35 volts. The waveforms differ in that a first one of the waveforms does not include a bias pulse, a second one of the waveforms includes a 20 microsecond bias pulse at 10 volts, and a third one of the waveforms includes a 40 microsecond bias pulse at 10 volts. As shown, the tip follows a similar movement pattern despite the differences in waveform. The movement pattern includes a first oscillation 1702, a second oscillation 1704, and a third oscillation 1706. As shown, the oscillations diminish in amplitude and period with time. Thus, to produce a single, well-defined oscillation of the actuating beam to produce well-defined fluid droplets, a period 1708 of the first oscillation 1702 is targeted as the duty cycle ON time. This way, the actuating beam only undergoes a single oscillation and sudden displacement of the oscillating beam resulting from cutting the drive pulse is prevented.

Figure 18:
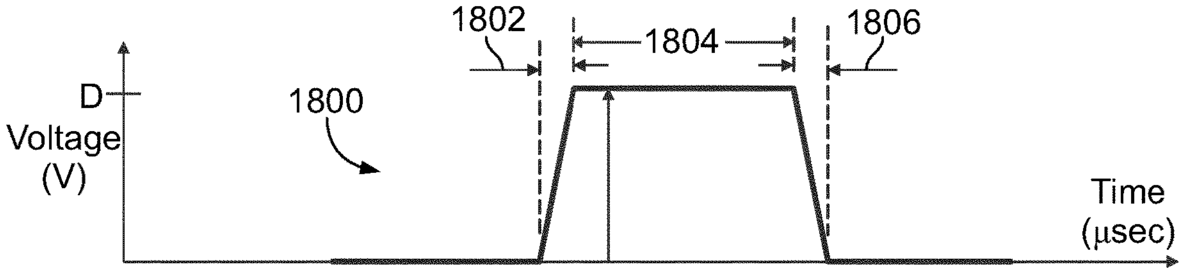
FIGS. 18, 19, 20, 21 and 22 are charts showing various drive waveforms for driving an actuating beam of a micro-valve, according to an example embodiment.

FIG. 18 shows an example drive waveform 1800 of a drive pulse that may be supplied to the micro-valves 812 via the controller 802. As shown, the drive waveform 1800 includes an upswing portion 1802, where a control signal voltage raises from zero to a predetermined voltage D. In some embodiments, during the upswing portion 1802, the voltage increases linearly. For example, in one embodiment, the voltage increases at a rate of 20 volts per micro-second. The slope may be limited by the performance of the controller 802. In some embodiments, the control signal may be communicated to a first electrode coupled to a first surface of a piezoelectric layer (e.g., the piezoelectric layer 414) of the actuating beam (e.g., actuating beam 240, **240*b*, 1000) located distal from the orifice plate (e.g., orifice plate 260, 260*b***) and a second electrode coupled to a second surface of the piezoelectric layer electrically coupled to common or system ground. In other embodiments, the first electrode is electrically coupled to the common or system ground and the control signal is provided to the second electrode.

Waveform 1800 further includes a driving portion 1804 where the control signal voltage holds steady at the predetermined voltage D for the drive pulse ON time. As described herein, the driving portion 1804 is of a duration that corresponds to a characteristic oscillation period of the actuating beam. Waveform 1800 also includes a downswing portion 1806 where the control signal voltage falls from the predetermined voltage D back to a baseline voltage. During the downswing portion 1806, the voltage may drop at a linear slope that is substantially equivalent to the slope of the upswing portion 1802.

Figure 19:
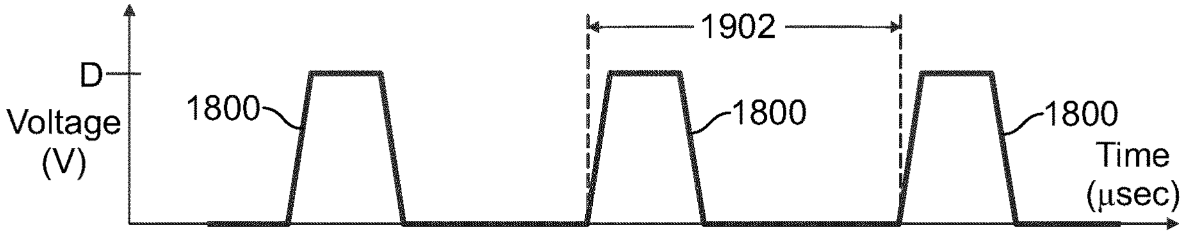

As will be appreciated, the controller 802 may repeatedly apply any drive waveforms to the actuating beam to cause the actuating beam to oscillate at a drive frequency. FIG. 19 shows an example where the controller applies multiple waveforms 1800. There are gaps or drive pulse OFF times between the waveforms 1800 such that a drive pulse is applied to the waveform every predetermined period 1902. As shown, the drive pulse ON time of the waveforms 1800 are less than half of the predetermined period 1902. Such spacing between successive waveforms 1800 enables resetting of the actuating beam to the default position with the orifice closed, and smoothens operation of the micro-valves 812 to facilitate droplet formation.

Figure 20:
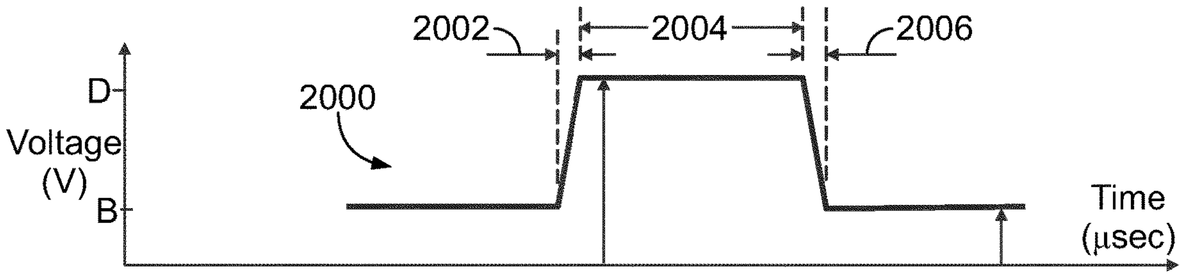

FIG. 20 shows another example drive waveform 2000 that may be applied to the micro-valves 812 via the controller 802. Like the drive waveform 1800, the drive waveform 2000 includes a drive pulse having a voltage upswing portion 2002, a driving portion 2004, and a voltage downswing portion 2006. The drive waveform 2000 differs from the drive waveform 2000 in that the baseline voltage to which the control signal returns is a non-zero bias voltage B. The bias voltage B may be 6 volts, 10 volts, or any other suitable value. Offsetting the baseline voltage from zero increases the responsiveness of the actuating beam and facilitates operation at higher frequencies. In other embodiments, the bias voltage may include a negative bias voltage.

Figure 21:
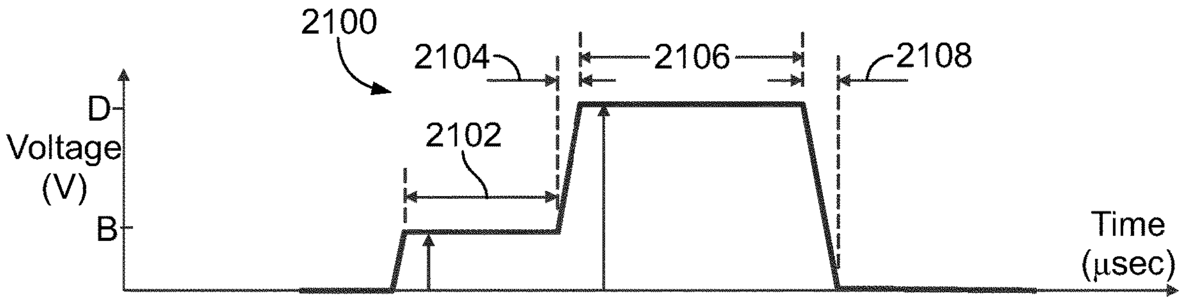
Figure 22:
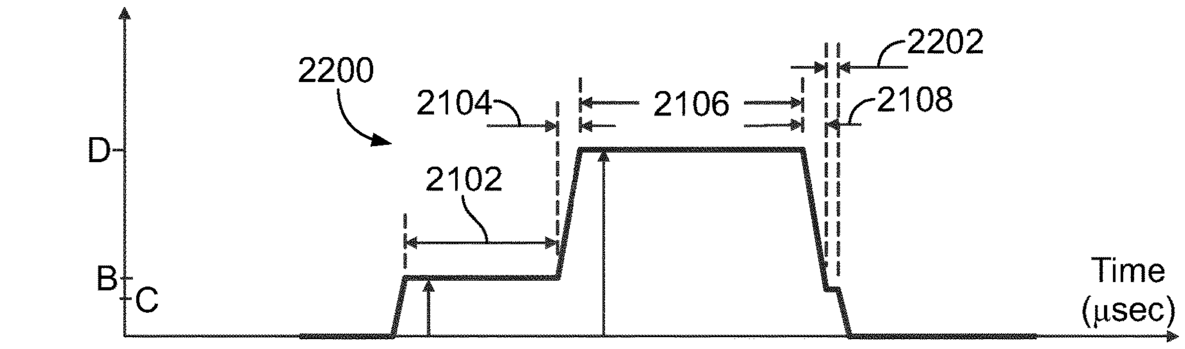

FIG. 21 shows another example drive waveform 2100 that may be applied to micro-valves 812 via the controller 802. As shown, drive waveform 2100 includes a drive pulse having a biasing portion 2102 (also referred to herein as "bias pulse 2102"), a voltage upswing portion 2104, a driving portion 2106, and a voltage downswing portion 2108. During the biasing portion 2102, the control signal voltage is increases from zero volts to the bias voltage and is temporarily set at the bias voltage only prior to the voltage upswing portion 2104, a driving portion 2106, and a voltage downswing portion 2108. In other words, after the driving portion 2106, the control signal voltage drops to a substantially zero baseline value. It has been found that the waveform 2100 provides performance improvements over the waveform 2000 by increasing the volume of droplets emitted resulting from the actuating beam's oscillations. FIG. 22 shows another example drive waveform 2200 that may be applied to micro-valves via the controller 802. The waveform 2200 is substantially similar to the waveform 2100, with the exception that it includes a stabilization plateau 2202 during the voltage downswing portion 2108. The stabilization plateau 2202 is at a voltage level C that is lower than the bias voltage B. It has been found that the inclusion of such a plateau improves performance of the controller 802 and thus improves operation of the marking system 800.

Figure 23:
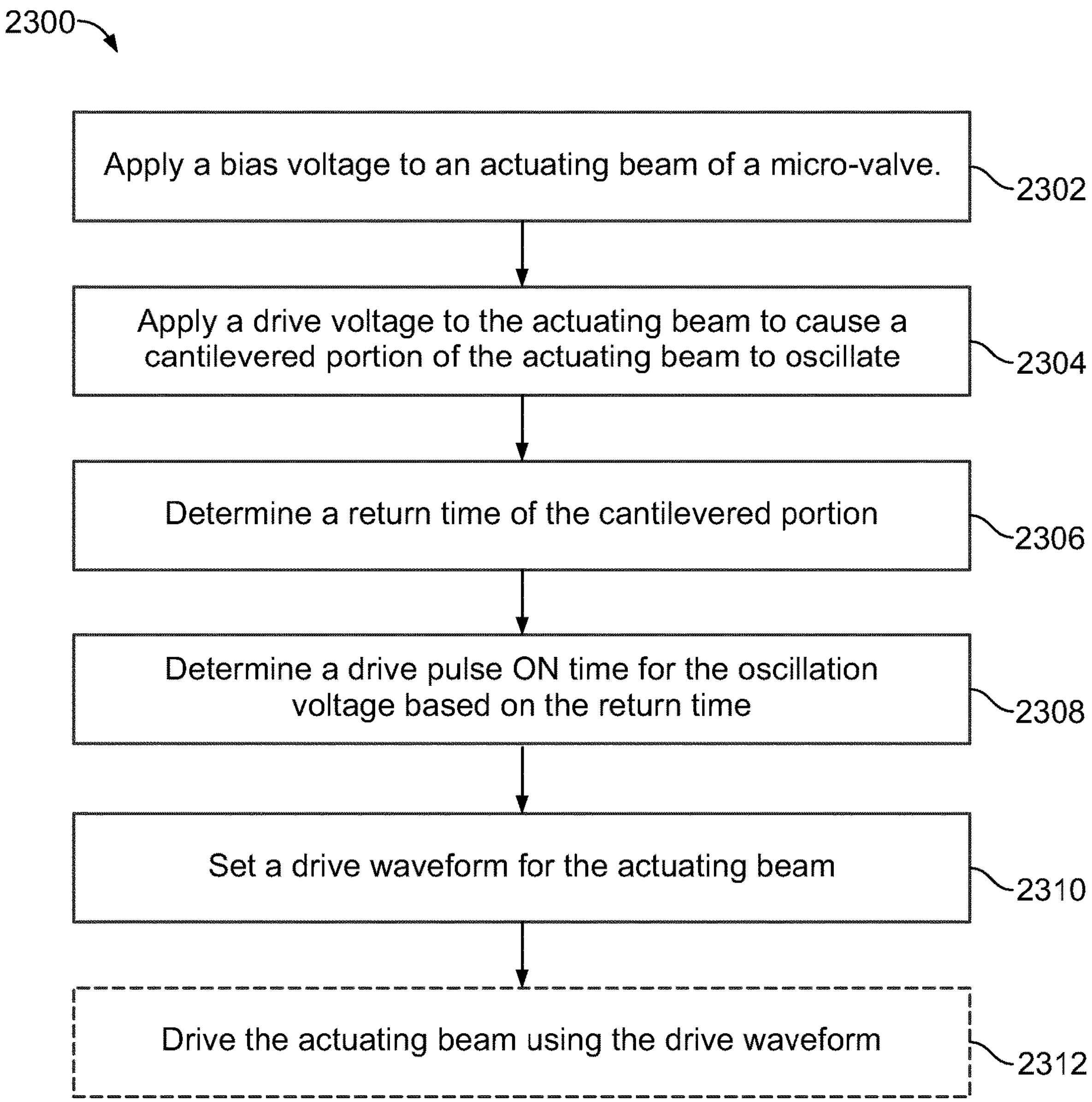
FIG. 23 is a flow diagram of a method of calibrating an actuating beam of a micro-valve, according to an example embodiment.

Referring now to FIG. 23, a flow diagram of a method 2300 of calibrating a micro-valve including an actuating beam is shown, according to an example embodiment. Method 2300 may be performed to determine a drive waveform (e.g., drive pulse ON time) for a micro-valve. Method 2300 may be repeated for any number of micro-valves to be included in a marking device.

In an operation 2302, a bias voltage is applied to an actuating beam. For example, a controller (e.g., the controller 802) may apply a baseline voltage (having a zero or nonzero value) to an actuating beam. In an operation 2304, a drive voltage is applied to the actuating beam to cause a cantilevered portion of the actuating beam to oscillate. For example, after application of the bias voltage, the controller may initiate application of a drive waveform that includes a voltage upswing portion where a control signal voltage increases to a predetermined voltage. The waveform may also include a driving portion where the control signal voltage remains constant at the predetermined voltage for the drive pulse ON time. The predetermined voltage may be selected to induce oscillations in the actuating beam. The predetermined voltage may be 20 volts or more.

In an operation 2306, a return time of the cantilevered portion is determined. In some embodiments, the return time includes a characteristic initial oscillation period of the actuating beam in response to the drive voltage. The initial oscillation period may include a time between points at which the actuating beam is in a default position. Between such points, the actuating beam may reach a peak position at which the actuating beam is completely departed from an orifice included in the micro-valve. The return time may be measured a number of different ways. For example, sound or vibration measurements may be performed to determine the return time. A microphone or vibration sensor for performing such measurements is described in more detail below.

In an operation 2308, a drive pulse length is determined based on the return time. In various embodiments the drive pulse ON time is selected to substantially correspond to, or exactly correspond to, the measured return time. In an operation 2310, a drive waveform is set for the actuating beam. The drive waveform may be set to have any of the forms described with respect to FIGS. 18-22. The set drive form may be used to drive the actuating beam, in operation 2312.

Figure 24:
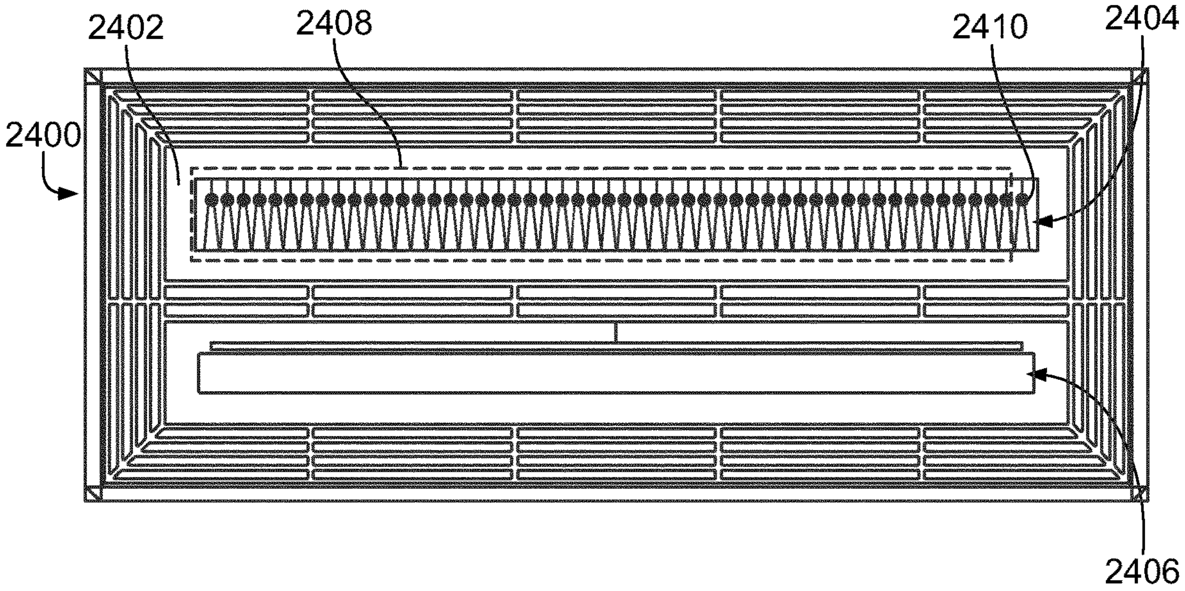
FIG. 24 shows a cross-sectional view of a jetting assembly 2400, according to an example embodiment.

FIG. 24 shows a cross-sectional view of a jetting assembly 2400, according to an example embodiment. Jetting assembly 2400 may have substantially the same structure as the jetting assembly 100 described with respect to FIGS. 1-4. As such, jetting assembly 2400 includes a fluid manifold 2402 that defines a first opening 2404 and a second opening 2406. The second opening 2406 aligns with a plurality of electrical connection portions associated with a plurality of actuating beams to which the fluid manifold 2402 is attached. The first opening 2404 aligns with a plurality of micro-valves formed via the methods described herein. Specifically, a plurality of micro-valves 2408 are in fluid communication with the first opening 2404 to define a reservoir to receive pressurized fluid for dispensing of pressurized fluid thereby. However, in the jetting assembly 2400, an isolated micro-valve 2410 is not in fluid communication with the first opening 2404. For example, a wall may be formed in the first opening 2404 in the fluid manifold 2402 to isolate the micro-valve 2410 from the plurality of micro-valves 2408. As such, a volume proximate to the actuating beam of the micro-valve 2410 may be void of any material, providing an empty chamber in which the actuating beam associated with the micro-valve 2410 to vibrate.

Figure 25:
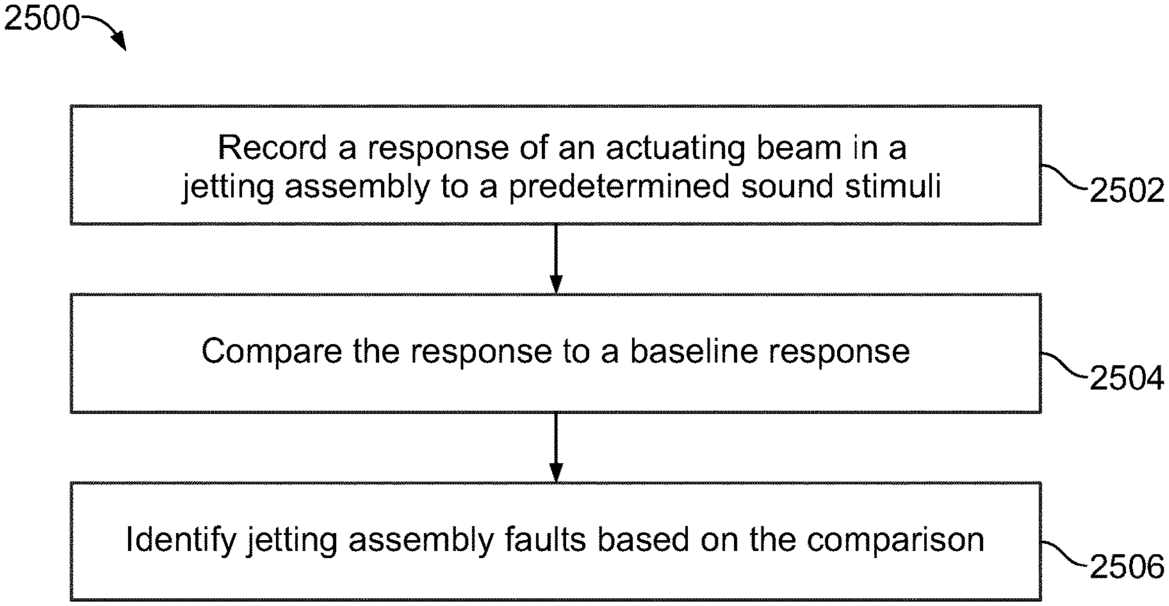
FIG. 25 is a flow diagram of a method 2500 of checking a jetting assembly for faults is shown, according to an example embodiment.

Since the actuating beam of the micro-valve 2410 has freedom to vibrate and does not dispense pressurized fluid, it can be used for alternative purposes. In some embodiments, the actuating beam is used as a microphone or vibration sensor. Since the actuating beam includes a layer of piezoelectric material, movements or bends of the actuating beam cause the layer of piezoelectric material to generate an electrical signal. The electrical signal is thus proportional to the acoustic response of the micro-valve 2410. This acoustic response may be used as an indicator for various faults in the jetting assembly 2400 (e.g., connections between various components therein). Expanding further, a jetting assembly (e.g., the jetting assembly 2400) may include a plurality of micro-valves, each having an actuating beam. One of the actuating beams of the plurality of actuating beams may form the acoustic sensor. The acoustic sensor may be configured to move responsive to movement of any one of the other actuating beams and generate an electrical signal corresponding to the movement of the other actuating beam. In such embodiments, a controller (e.g., the controller 802) may be configured to measure the electrical signal from the acoustic sensor and determine if the other actuating beam is moving correctly based on the electrical signal. The controller may be further configured to provide a fault indication if the electrical signal departs from a baseline, the fault indication indicative of the other actuating beam not moving correctly Referring now to FIG. 25, a flow diagram of a method 2500 of checking a jetting assembly for faults is shown, according to an example embodiment. Method 2500 may, for example, be performed by a controller (e.g., the controller 802) or an external computing device connected to the jetting assembly 2400 described with respect to FIG. 24. For example, a controller may receive electrical signals generated by the isolated micro-valve 2410 to identify potential faults in the jetting assembly 2400.

In an operation 2502, a response of an actuating beam to a predetermined sound stimuli is recorded. The sound stimuli may be selected to have a frequency within the bandwidth of the micro-valve 2410 such that the sound stimuli causes vibration of the micro-valve 2410's actuating beam. Such vibrations may cause the layer of piezoelectric material contained in the actuating beam to generate an electrical signal. The electrical signal may be provided to the controller via wire bonds extending between the actuating beam and a flex circuit communicably coupled to the controller. The controller may store the response in memory for future analysis. In some embodiments, a plurality of sound stimuli are applied. For example, a plurality of sound stimuli at differing frequencies may be applied to measure the micro-valve 2410's frequency response.

In an operation 2504, the response is compared to a baseline response. For example, the controller may store a plurality of past responses of the micro-valve 2410 to the sound stimuli applied at operation 2502 for future comparisons. In an operation 2506, jetting assembly faults are identified based on the comparison. For example, deviations of certain aspects of the response recorded at operation 2502 and the baseline response may be indicative of certain jetting assembly faults. A change in the micro-valve 2410's frequency response, for example, may be indicative of a faulty connection between the orifice plate and the actuating beam, for example. Thus, via the micro-valve 2410 users may test the jetting assembly 2400 without performing invasive testing procedures thereon.

As previously described herein, application of a drive pulse to an actuating beam of a micro-valve may cause a tip of the actuating beam to move away from its default position (e.g., a closed position in which a sealing member disposed on a tip of the beam closes an orifice of the micro-valve) towards a peak or open position. In some instances however, the actuating beam may reach or over shoot a desired peak position and then recoil towards the orifice resulting in oscillations of the actuating beam, for example, as described with respect to FIG. 9 wherein the actuating beam 1000 reverses direction such that the tip 1002 of the actuating beam 1000 approaches the default position and substantially reaches the default position at 910. This may be undesirable as oscillation of the actuating beam, particularly movement of the tip back towards the default position during the drive pulse ON time may cause splattering of the ejected fluid due to kinetic energy of the tip of the actuating beam returning towards its default position, and/or ejection of inaccurate amount of the fluid.

Figure 26:
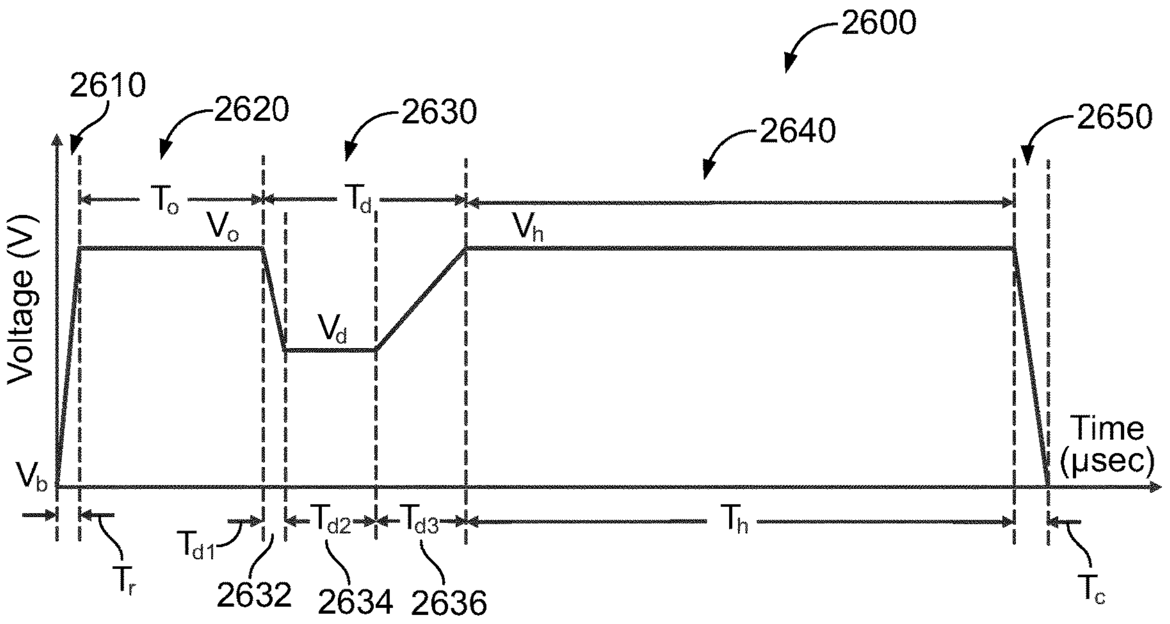
FIG. 26 is a plot showing a drive waveform for driving an actuating beam of a micro-valve, according to an example embodiment.

FIG. 26 is a chart showing an example drive waveform 2600 of a drive pulse generated by a controller (e.g., the controller 802) to limit oscillations of the tip of the actuating beam so as to prevent splattering and enable ejection of an accurate amount of fluid from the micro-valve. The drive pulse is configured to move the actuating beam from the closed position to the peak position in which the corresponding orifice is open, and returns to the closed position in a characteristic period which may correspond to a total drive pulse ON time.

The drive waveform 2600 includes an opening portion 2620, a deceleration portion 2630 and a hold portion 2640.

The opening portion 2620 comprises an opening voltage $V_o$ configured to move the actuating beam towards the peak position at a velocity. The velocity may correspond to an amplitude of the opening voltage $V_o$. The opening voltage may be sufficient to cause lift-off of a tip of the actuating beam from the orifice or a valve seat disposed around the orifice and sealed by the tip of the actuating beam towards the peak position thereby opening the micro-valve and allowing ejection of fluid through the orifice.

The drive waveform 2600 may also include a ramp portion 2610 for increasing a voltage applied to the actuating beam from a bias voltage $V_b$ to the opening voltage $V_o$ within a ramp time $T_r$ (e.g., in a range of 1-3 μseconds). In some embodiments, the actuating beam may be unbiased before application of the drive pulse thereon, i.e., the bias voltage $V_b$ is zero. In such embodiments, the actuating beam may be structured such that a default or resting position of the actuating beam may be the closed position in which a tip of the actuating beam seals the orifice (e.g., the actuating beam may be pre-stressed such that it inherently bends towards the orifice). In other embodiments, the controller (e.g., the controller 802) may be configured to apply a non-zero bias voltage $V_b$ to the actuating beam when the drive pulse is not applied. The bias voltage $V_b$ may reduce stress on the actuating beam without moving the actuating beam into the peak position away from the corresponding orifice and/or may urge the tip of the actuating beam towards the orifice, for example, to improve sealing of the orifice in the closed position, as previously described herein. The bias voltage $V_b$ may include a positive or a negative bias. In such embodiments, the ramp portion 2610 increases the bias voltage $V_b$ to the opening voltage $V_o$ in the ramp time $T_r$.

The opening voltage $V_o$ may be applied to the actuating beam for an opening time $T_o$ sufficient to curve the tip of the actuating beam proximate to the peak position but not reaching the peak position. The opening time may be in a range of 30-34 μseconds. To prevent the actuating beam from moving beyond the peak position relative to the corresponding office, the drive waveform 2600 includes the deceleration portion 2630 configured to retard the velocity of the actuating beam (e.g., a tip of the actuating beam) as it moves towards the peak position. Slowing the velocity of the actuating beam may allow the tip of the actuating beam to reach or substantially reach the peak position while preventing recoil of the tip of the actuating beam towards its default position and/or limit oscillation amplitude of the tip of the actuating beam about the peak position so as to reduce or otherwise eliminate splatter and allow ejection of accurate quantities of the fluid from the micro-valve. The deceleration portion 2630 is followed by the hold portion 2640 comprising a hold voltage VI, configured to hold the actuating beam proximate to the peak position for a hold time Tn. In some embodiments, the hold voltage VI, may be substantially equal to the opening voltage $V_o$.

The deceleration portion 2630 may include a first deceleration portion 2632 configured to decrease the opening voltage $V_o$ to a deceleration voltage $V_d$ lower than the opening voltage $V_o$ but higher than the bias voltage $V_b$ within a first deceleration time $T_{d1}$ (e.g., in a range of 1-3 μseconds). The deceleration portion 2630 also includes a second deceleration portion 2634 configured to bias the actuating beam at the deceleration voltage $V_d$ for a second deceleration time $T_{d2}$ (e.g., in a range of 8-12 μseconds). The second deceleration portion 2634 is configured to slow the velocity of the tip of the actuating beam to prevent overshoot. A third deceleration portion 2636 included in the deceleration portion 2630 is configured to increase the deceleration voltage $V_d$ to the hold voltage VI, within a third deceleration time $T_{d3}$ (e.g., in a range of 8-12 μseconds).

While the second deceleration portion 2634 may serve to slow the velocity of the actuating beam to prevent overshoot from the peak position, the third deceleration portion 2636 increases the deceleration voltage $V_d$ to the hold voltage $V_h$ to maintain the tip of the actuation beam proximate to the peak position once it has reached or substantially reached the peak position. In this manner, the third deceleration portion 2640 may prevent over slowing of the actuating beam which may result in tip of the actuating beam being positioned substantially below the peak position or start returning towards the default position. Thus, a second deceleration time $T_{d2}$ and the third deceleration time $T_{d3}$ may be carefully controlled to slow the velocity of the actuating beam to prevent overshoot, while increasing the decelerating voltage $V_d$ to the hold voltage VI, before the tip of the actuating beam starts returning towards its default position.

The drive waveform 2600 also includes a closing portion 2650 configured to return the actuating beam to the closed position within a closing time $T_c$ (e.g., in a range of 1-3 μseconds), for example, by reducing the hold voltage to the bias voltage $V_b$. The sum of each of the ramp time $T_r$, a total deceleration time $T_d$, a hold time $T_h$ and the closing time $T_c$ represents the characteristic period of the drive pulse and defines a volume or mass of the fluid ejected from the orifice of the micro-valve. The hold time Tb may be adjusted to vary a volume or mass of the fluid ejected from the orifice of the micro-valve. In various embodiments, the hold time $T_h$ may be in a range of 5-100 μseconds (e.g., 5, 10, 15, 20, 25, 30, 35, 40, 50, 60, 70, 80, 90 or 100 μseconds) or even higher.

In some embodiments, the controller (e.g., the controller 802) may be configured to repeatedly apply a plurality of drive pulses including the drive waveform 2600 at a drive frequency. Each of the drive pulses may include a drive pulse ON time (e.g., the characteristic period during which the drive waveform 2600 is applied) in which the actuating beam moves into the peak position, and a drive pulse OFF time in which the actuating beam remains in the closed position. In other words, each drive pulse is separated by a drive pulse OFF time in which, for example, the actuating beam may be held at the biasing voltage $V_b$ and maintained in the closed position. In particular embodiments, the drive pulse OFF time may be at least 10% of the drive pulse ON time. In various embodiments, the drive frequency of the drive pulse may be less than a natural oscillation frequency of the actuating beam (which may be in a range of 1-30 kHz).

Figure 27:
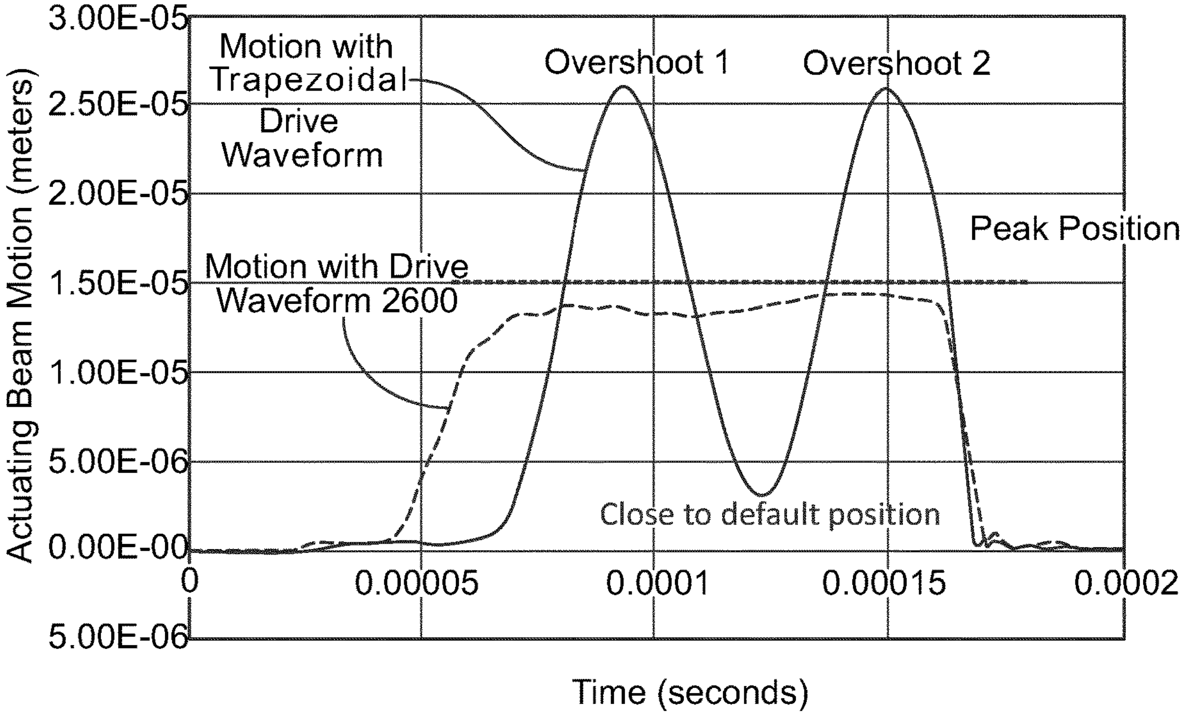
FIG. 27 are plots showing motion of an actuating beam of a micro-valve in response to a trapezoidal drive waveform, and the drive waveform of FIG. 26.

FIG. 27 are plots showing motion of an actuating beam in response to a trapezoidal drive waveform that does not include the deceleration portion, and motion of the same actuating beam when driven by the drive waveform 2600. With the trapezoidal waveform, the actuating beam experiences a first overshoot (overshoot 1) beyond the peak position, followed by a recoil of the actuating beam where the actuating beam returns close to the default position (i.e., proximate to the orifice) and then a second overshoot portion (overshoot 2) in which the actuating beam again overshoots the peak position. The overshooting and return proximate to the default position of the actuating beam in response to the trapezoidal waveform may result in splattering of the ejected fluid as previously described herein, which is undesirable. In contrast, the drive waveform 2600 causes the tip of the beam to approach the peak position without overshoot, thereby preventing splattering, and maintains the tip of the actuating beam proximate to the peak position for the hold time to allow an accurate amount of fluid to be ejected from the orifice.

Figure 28:
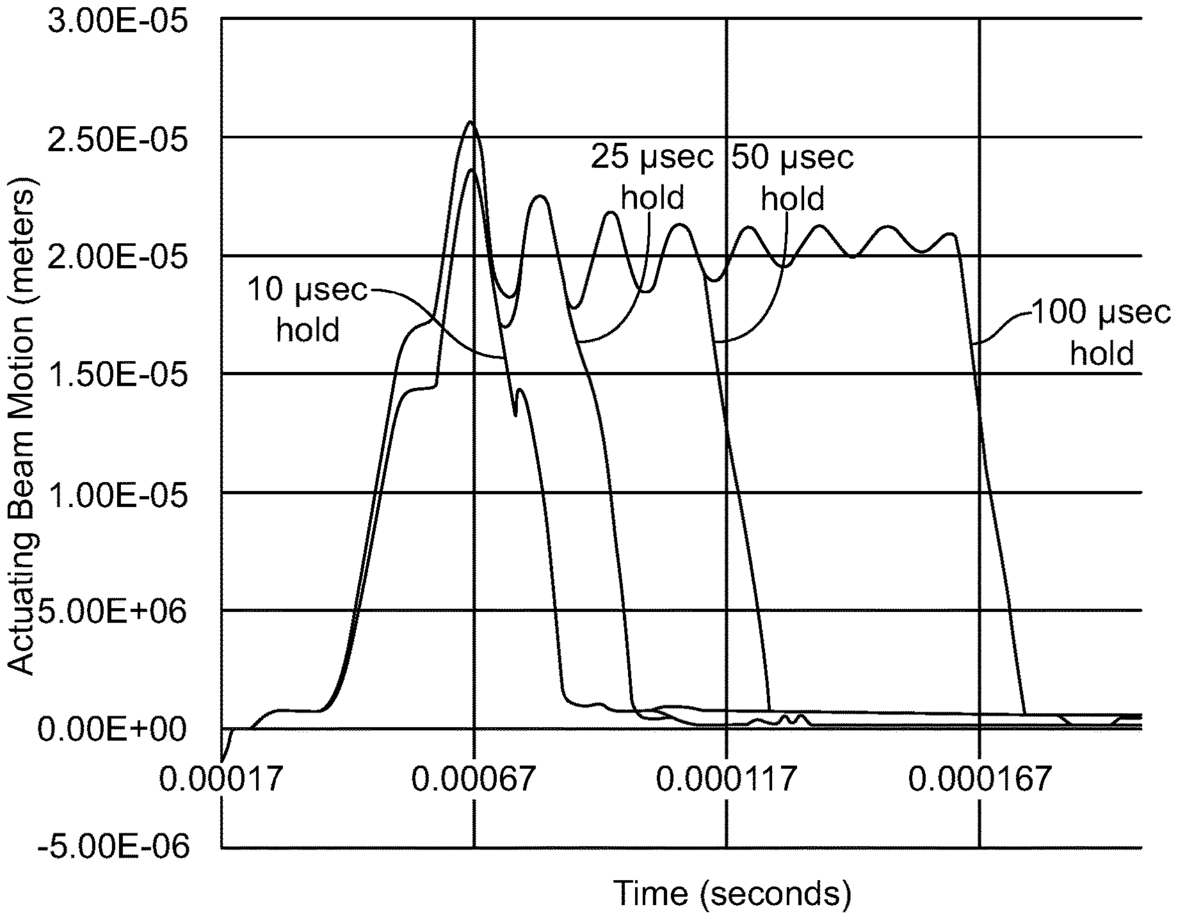
FIG. 28 are plots showing motion of an actuating beam of a micro-valve in response to the drive waveform of FIG. 26 including a hold portion having hold times of 10 μseconds, 25 μseconds, 50 μseconds and 100 μseconds.
Figure 29:
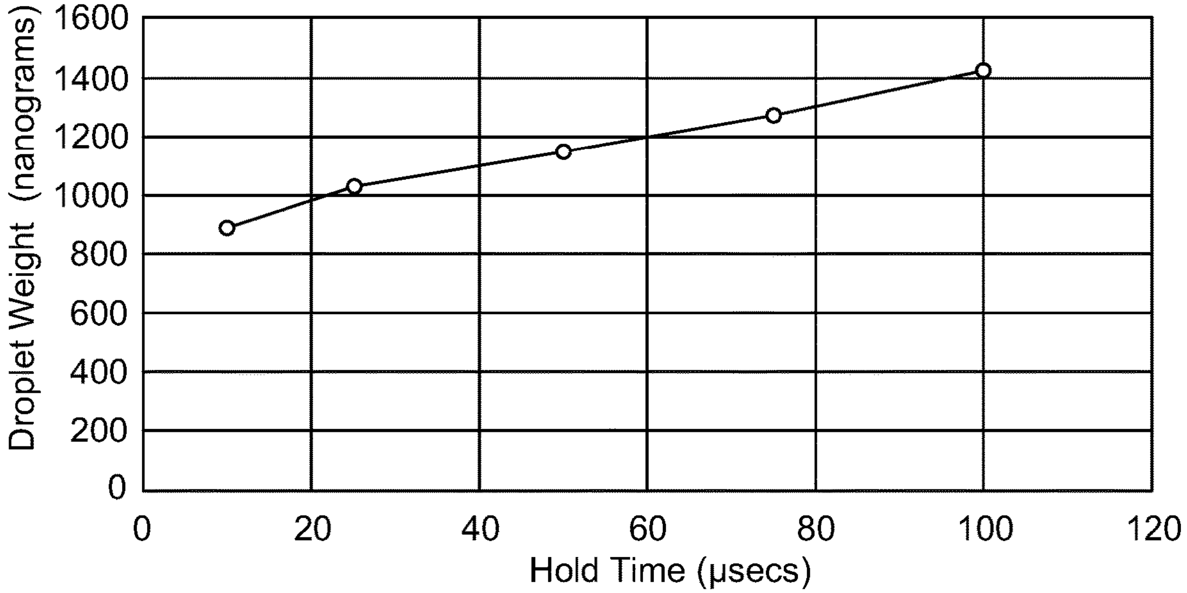
FIG. 29 is a plot of weight of a droplet of fluid ejected from a corresponding orifice of the micro-valve in response to the beam motions shown in FIG. 28.

FIG. 28 are plots showing motion of an actuating beam in response to a the drive waveform 2600 including hold portions 2640 having hold times Tb of 10, 25, 50 and 100 μseconds. FIG. 29 shows a mass of the fluid ejected from the micro-valve including the actuating beam in response to the various hold times Tn. As seen from FIG. 29, the mass of the ejected fluid may be adjusted approximately linearly by simply adjusting the hold time $T_h$ of the hold portion 2640 of the drive waveform 2600.

Figure 30:
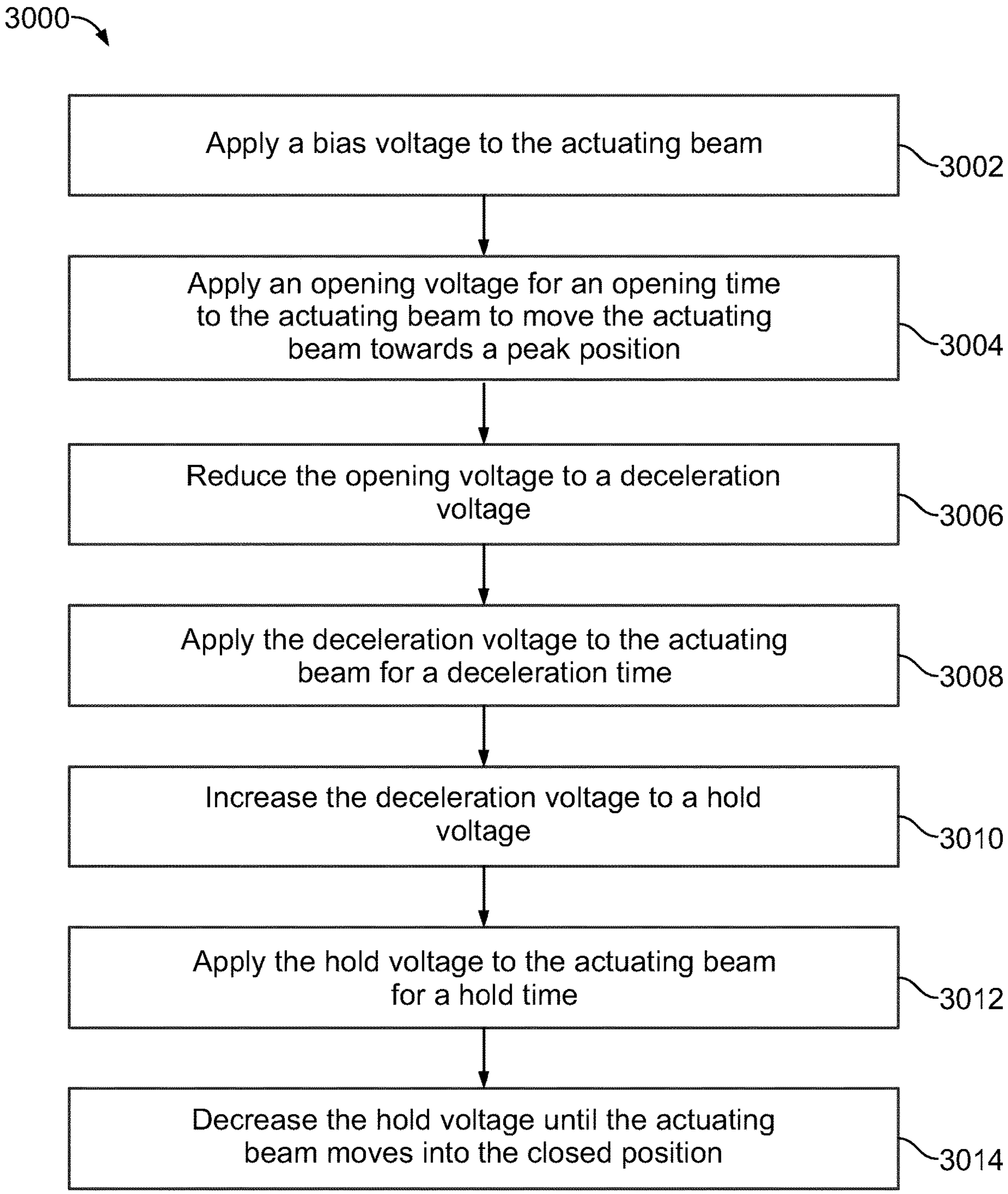
FIG. 30 is a schematic flow diagram of a method for driving an actuating beam of a micro-valve, according to an example embodiment.

FIG. 30 is a schematic flow diagram of a method 3000 for driving an actuating beam (e.g., the actuating beam 240, 240*b* or any other actuating beam described herein) included in a micro-valve (e.g., the micro-valve 230, 230*b* or any other micro-valve described herein). In some embodiments, the method 3000 includes applying a bias voltage to the actuating beam, at 3002. For example, the controller 802 may apply a positive or a negative bias voltage on the actuating beam so as to reduce stress on the actuating beam without moving the actuating beam into the peak position away from the orifice and/or urge the actuating beam towards the orifice so as to enhance a seal that the sealing member of the actuating beam forms with the orifice.

At 3004, an opening voltage is applied to the actuating beam to move the actuating beam from a closed position, in which a corresponding orifice of the micro-valve is closed by the actuating beam, towards a peak position away from the corresponding orifice so as to open the corresponding orifice. For example, voltage applied to the actuating beam may be increased from the bias voltage $V_b$ during the ramp portion 2610 of the drive waveform 2600 to the opening voltage $V_o$ and maintained at the opening voltage $V_o$ for the opening time $T_o$.

At 3006, the opening voltage is reduced to a deceleration voltage. At 3008, the deceleration voltage is applied to the actuating beam for a deceleration time to prevent the actuating beam from moving beyond the peak position relative to the corresponding orifice. For example, the first deceleration portion 2632 may reduce the voltage applied on the actuating beam from the opening voltage $V_o$ to the deceleration voltage $V_d$. The second deceleration portion 2634 may maintain the deceleration voltage $V_d$ on the actuating beam for reducing velocity of the beam and prevent overshoot beyond the peak position, as previously described herein.

At 3010, the deceleration voltage is increased to a hold voltage. At 3012, the hold voltage is applied to the actuating beam for a hold time to hold the beam proximate to the peak position for a predetermined time. For example, the deceleration portion 2636 may increase the voltage applied to the actuating beam from the deceleration voltage $V_d$ to the hold voltage $V_h$. The hold voltage $V_h$ may be applied to the actuating beam for the hold time $T_h$ during the hold portion 2640, the hold time $T_h$ being adjustable so as to allow ejection of a predetermined mass or volume of the fluid from the orifice of the micro-valve. In some embodiments, the hold voltage $V_h$ may be equal to the opening voltage $V_o$. At 3014, the hold voltage is decreased until the actuating beam moves into the closed position. For example, the voltage applied on the actuating beam is decreased from the hold voltage $V_h$ to the bias voltage $V_b$ during the closing portion 2650 of the drive waveform 2600 to close the micro-valve.

In some embodiments, a marking system comprises a valve body comprises: an orifice plate including a plurality of orifices extending therethrough; a plurality of micro-valves, wherein each of the plurality of micro-valves comprises: an actuating beam movable from a closed position in which a corresponding one of the plurality of orifices is sealed by a portion of the actuating beam such that the micro-valve is closed, wherein the actuating beam is movable from the closed position into a peak position away from the corresponding one of the plurality of orifices in response to application of a control signal thereto; and a controller electrically connected to the actuating beams, the controller configured to generate a control signal for each of the actuating beams, wherein each control signal comprises a drive pulse having a predetermined voltage, wherein, in response to the drive pulse, the actuating beam oscillates such that the actuating beam moves from the closed position to the peak position in which the corresponding orifice is open and returns to the closed position in a characteristic period.

In some embodiments, the drive pulse of the marking system has a duration that substantially corresponds to the characteristic period such that the actuating beam is in the closed position after the drive pulse is complete.

In some embodiments, the controller is configured to repeatedly apply a plurality of the drive pulses to the actuating beam at a drive frequency In some embodiments, each of the plurality of drive pulses comprises a drive pulse ON time in which the actuating beam moves into the peak position, and a drive pulse OFF time in which the actuating beam remains in the closed position.

In some embodiments, the drive pulse OFF time is at least 15% of the drive pulse duration. In some embodiments, a drive frequency of the drive pulse is less than a natural oscillation frequency of the actuating beam. In some embodiments, the natural frequency is in a range of 1 KHz and 30 KHz. In some embodiments, the controller is configured to apply a bias voltage to the actuating beam when the drive pulse is not applied to the actuating beam.

In some embodiments, the controller is configured to apply a bias voltage to the actuating beam such that the drive pulse is part of a drive waveform, and the drive waveform comprises a voltage upswing portion in which the control signal increases from the bias voltage to the predetermined voltage, a driving portion in which the predetermined voltage is applied for the drive pulse ON time, and a voltage downswing portion in which the control signal decreases from the predetermined voltage to the bias voltage.

In some embodiments, the bias voltage reduces stress on the actuating beam without moving the actuating beam into the peak position away from the orifice. In some embodiments, the bias voltage includes one of a positive bias voltage or a negative bias voltage.

In some embodiments, the controller is configured to apply a bias voltage to the actuating beam, such that the drive pulse is part of a drive waveform, and the drive waveform comprises a biasing portion in which the control signal increases from zero volts to the bias voltage, a voltage upswing portion in which the control signal increases from the bias voltage to the predetermined voltage, a driving portion in which the predetermined voltage is applied for the drive pulse ON time, and a voltage downswing portion in which the control signal decreases from the predetermined voltage to zero volts.

In some embodiments, the valve body further comprises a fluid manifold coupled to each of the plurality of micro-valves to define a reservoir configured to contain a pressurized fluid to be dispensed when the actuating beams depart from the closed positions.

In some embodiments, one of the actuating beams forms an acoustic sensor, the acoustic sensor configured to move in response to movement of any one of the other actuating beam and generate an electrical signal corresponding to the movement of the other actuating beam.

In some embodiments, the controller is further configured to measure the electrical signal from the acoustic sensor and determine if the other actuating beam is moving correctly based on the electrical signal. In some embodiments, the controller is configured to provide a fault indication if the electrical signal departs from a baseline, the fault indication indicative of the other actuating beam not moving correctly.

In some embodiments, a method of calibrating a marking system including at least one actuating beam, comprises: applying, by a controller electrically connected to an actuating beam of a micro-valve, a drive pulse to the actuating beam, the drive pulse having a predetermined voltage configured to induce an oscillation of the actuating beam; determining an oscillation period of a natural frequency of the actuating beam, the oscillation period including an interval between successive times in which the actuating beam is in a closed position where the actuating beam seals an orifice in an orifice plate on which the actuating beam is disposed such that the micro-valve is closed; determining a drive pulse ON time based on the oscillation period; and setting a drive waveform for the actuating beam, the drive waveform comprising a biasing portion in which the control signal increases from zero volts to a bias voltage, a voltage upswing portion in which a control signal voltage rises from a bias voltage to the predetermined voltage, a driving portion where the control signal voltage is at the predetermined voltage for the drive pulse ON time, and a voltage downswing portion in which the control signal voltage falls from the predetermined voltage to the bias voltage or zero.

In some embodiments, the drive pulse ON time is less than the natural oscillation period. In some embodiments, the predetermined voltage is 35 volts.

In some embodiments, the method further comprises repeating the actuating beam calibration method for each of a plurality of additional micro-valves included in the marking system. In some embodiments, the biasing portion has a biasing period less than the drive pulse ON time.

In some embodiments, the method further comprises driving the actuating beam using the drive waveform.

In some embodiments, a marking system comprises: a valve body comprising: an orifice plate including at least one orifice extending therethrough; at least one micro-valve comprising an actuating beam movable from a closed position, in which a corresponding orifice of the at least one orifice is sealed by a portion of the actuating beam such that the micro-valve is closed, towards a peak position away from the corresponding orifice in response to application of a control signal thereto; and a controller electrically connected to the actuating beam, the controller configured to generate a control signal for the actuating beam, wherein the control signal comprises a drive pulse configured to move the actuating beam from the closed position to the peak position in which the corresponding orifice is open and returns to the closed position in a characteristic period. The drive pulse includes a drive waveform comprising: an opening portion comprising an opening voltage configured to move the actuating beam towards the peak position at a velocity; a deceleration portion configured to retard the velocity of the actuating beam so as to prevent the actuating beam from moving beyond the peak position relative to the corresponding orifice; a hold portion comprising a hold voltage configured to hold the beam proximate to the peak position for a predetermined hold time; and a closing portion configured to return the actuating beam to the closed position.

In some embodiments, the controller is configured to apply a bias voltage to the actuating beam when the drive pulse is not applied to the actuating beam, and wherein the drive pulse further comprises a ramp portion configured to increase the bias voltage to the opening voltage within a ramp time. In some embodiments, the bias voltage reduces stress on the actuating beam without moving the actuating beam into the peak position away from the corresponding orifice. In some embodiments, the bias voltage includes one of a positive bias voltage or a negative bias voltage. In some embodiments, the hold voltage is substantially equal to the opening voltage.

In some embodiments, the deceleration portion comprises: a first deceleration portion configured to decrease the opening voltage to a deceleration voltage within a first deceleration time; a second deceleration portion configured to bias the actuating beam at the deceleration voltage for a second deceleration time; and a third deceleration portion configured to increase the deceleration voltage to the hold voltage within a third deceleration time.

In some embodiments, the first deceleration time is in a range of 1-3 μseconds, the second deceleration time is in a range of 8-12 μseconds and the third deceleration time is in a range of 8-12 μseconds.

In some embodiments, the controller is configured to repeatedly apply a plurality of the drive pulses to the actuating beam at a drive frequency. In some embodiments, each of the plurality of drive pulses comprises a drive pulse ON time corresponding to the characteristic period, and a drive pulse OFF time in which the actuating beam remains in the closed position. In some embodiments, the drive pulse OFF time is at least 10% of the drive pulse ON time.

In some embodiments, a drive frequency of the drive pulse is less than a natural oscillation frequency of the actuating beam. In some embodiments, the natural frequency is in a range of 1 KHz and 30 KHz.

In some embodiments, the valve body further comprises a fluid manifold coupled to each of the plurality of micro-valves to define a reservoir configured to contain a pressurized fluid to be dispensed when the actuating beams depart from the closed positions.

In some embodiments, one of the actuating beams forms an acoustic sensor, the acoustic sensor configured to move in response to movement of any one of the other actuating beams and generate an electrical signal corresponding to the movement of the other actuating beam.

In some embodiments, the controller is further configured to measure the electrical signal from the acoustic sensor and determine if the other actuating beam is moving correctly based on the electrical signal. In some embodiments, the controller is configured to provide a fault indication if the electrical signal departs from a baseline, the fault indication indicative of the other actuating beam not moving correctly.

In some embodiments, a method of driving an actuating beam included in a micro-valve, comprises: applying an opening voltage to the actuating beam for an opening time to move the actuating beam from a closed position, in which a corresponding orifice of the micro-valve is closed by the actuating beam, towards a peak position away from the corresponding orifice so as to open the corresponding orifice; reducing the opening voltage to a deceleration voltage; applying the deceleration voltage to the actuating beam for a deceleration time to prevent the actuating beam from moving beyond the peak position relative to the corresponding orifice; increasing the deceleration voltage to a hold voltage; applying the hold voltage to the actuating beam for a hold time to hold the beam proximate to the peak position for a predetermined time; and decreasing the hold voltage until the actuating beam moves into the closed position.

In some embodiments, method further comprises prior to applying the opening voltage, applying a bias voltage to the actuating beam to hold the beam in the closed position, wherein applying the opening voltage comprises increasing the bias voltage to the opening voltage. In some embodiments, the hold voltage is decreased to the bias voltage to move the actuating beam into the closed position. In some embodiments, the bias voltage reduces stress on the actuating beam without moving the actuating beam into the peak position away from the orifice. In some embodiments, the bias voltage includes one of a positive bias voltage or a negative bias voltage. In some embodiments, the hold voltage is substantially equal to the opening voltage.

As used herein, the terms "about" and "approximately" generally mean plus or minus 10% of the stated value. For example, about 0.5 would include 0.45 and 0.55, about 10 would include 9 to 11, about 1000 would include 900 to 1100.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

The construction and arrangement of the elements as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" or as an "example" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A system of micro-valves comprising:

a valve body comprising:

an orifice plate including one or more orifices extending therethrough;

at least one micro-valve, wherein each of the at least one micro-valve comprises:

an actuating beam movable from a closed position in which a corresponding one of the one or more orifices is sealed by a portion of the actuating beam such that the micro-valve is closed, wherein the actuating beam is movable from the closed position into a position away from the corresponding one of the one or more orifices in response to application of a plurality of drive pulses, wherein a frequency of the plurality of drive pulses, a diameter of the one or more orifices, and a characteristic period of the actuating beam are configured to allow a volume of fluid to enter the one or more orifices and form a droplet on an exterior surface of the orifice plate.

2. The system of claim 1, wherein each drive pulse has a duration that substantially corresponds to the characteristic period such that the actuating beam is in the closed position after the drive pulse is complete.

3. The system of claim 1, wherein each of the plurality of drive pulses comprises a drive pulse ON time in which the actuating beam moves into the away position, and a drive pulse OFF time in which the actuating beam remains in the closed position.

4. The system of claim 3, wherein the drive pulse OFF time is at least 15% of a drive pulse duration.

5. The system of claim 3, further comprising a controller configured to apply a bias voltage to the actuating beam, wherein the drive pulse is part of a drive waveform, wherein the drive waveform comprises a voltage upswing portion in which the drive pulse increases from the bias voltage to a predetermined voltage, a driving portion in which the predetermined voltage is applied for the drive pulse ON time, and a voltage downswing portion in which the control signal decreases from the predetermined voltage to the bias voltage.

6. The system of claim 5, wherein the bias voltage reduces stress on the actuating beam without moving the actuating beam into the away position away from the orifice.

7. The system of claim 6, wherein the bias voltage includes one of a positive bias voltage or a negative bias voltage.

8. The system of claim 3, further comprising a controller configured to apply a bias voltage to the actuating beam, wherein the drive pulse is part of a drive waveform, wherein the drive waveform comprises a biasing portion in which the drive pulse increases from zero volts to the bias voltage, a voltage upswing portion in which the control signal increases from the bias voltage to a predetermined voltage, a driving portion in which the predetermined voltage is applied for the drive pulse ON time, and a voltage downswing portion in which the control signal decreases from the predetermined voltage to zero volts.

9. The system of claim 1, wherein a drive frequency of the drive pulse is less than a natural oscillation frequency of the actuating beam.

10. The system of claim 9, wherein the natural frequency is in a range of 1 KHz and 30 KHz.

11. The system of claim 1, further comprising a controller configured to apply a bias voltage to the actuating beam when the drive pulse is not applied to the actuating beam.

12. The system of claim 1, wherein the valve body further comprises a fluid manifold coupled to each of the plurality of micro-valves to define a reservoir configured to contain a pressurized fluid to be dispensed when the actuating beams depart from the closed positions.

13. The system of claim 1, wherein at least one of the actuating beams forms an acoustic sensor, the acoustic sensor configured to move in response to movement of any one of the other actuating beam and generate an electrical signal corresponding to the movement of the other actuating beam.

14. The system of claim 13, further comprising a controller configured to measure the electrical signal from the acoustic sensor and determine if the other actuating beam is moving correctly based on the electrical signal.

15. The system of claim 14, wherein the controller is configured to provide a fault indication if the electrical signal departs from a baseline, the fault indication indicative of the other actuating beam not moving correctly.

16. The system of claim 1, wherein the droplet has a mass between 200 and 300 nanograms.

17. The system of claim 1, wherein each actuating beam comprises a sealing member aligned to contact a valve seat disposed at the corresponding one of the one or more orifices.

18. The system of claim 17, wherein a distance between sealing member and the valve seat in the away position is at least 10 microns.

* * * * *